United States Patent
Fleming et al.

(10) Patent No.: US 9,787,511 B2
(45) Date of Patent: Oct. 10, 2017

(54) METHODS, DEVICES AND SYSTEMS FOR RECEIVING AND DECODING A SIGNAL IN THE PRESENCE OF NOISE USING SLICES AND WARPING

(71) Applicant: Proteus Digital Health, Inc., Redwood City, CA (US)

(72) Inventors: Robert Fleming, Nicasio, CA (US);
Cherie Kushner, Nicasio, CA (US);
William H. McAllister, Saratoga, CA (US); Mark Zdeblick, Portola Valley, CA (US)

(73) Assignee: PROTEUS DIGITAL HEALTH, INC., Redwood City, CA (US)

( * ) Notice: Subject to any disclaimer, the term of this patent is extended or adjusted under 35 U.S.C. 154(b) by 0 days.

(21) Appl. No.: 14/989,409

(22) Filed: Jan. 6, 2016

(65) Prior Publication Data
US 2016/0261441 A1    Sep. 8, 2016

Related U.S. Application Data

(63) Continuation of application No. 14/491,447, filed on Sep. 19, 2014, now Pat. No. 9,270,503.
(Continued)

(51) Int. Cl.
*H04L 27/148*  (2006.01)
*H04L 25/08*  (2006.01)
(Continued)

(52) U.S. Cl.
CPC ............ *H04L 27/148* (2013.01); *H04B 1/001* (2013.01); *H04L 7/042* (2013.01); *H04L 25/08* (2013.01);
(Continued)

(58) Field of Classification Search
CPC ... H04L 25/08; H04L 27/0014; H04L 27/144; H04L 27/148; H04L 69/22; H04L 7/042
See application file for complete search history.

(56) References Cited

U.S. PATENT DOCUMENTS

| 3,340,866 A | 9/1967 | Noller |
| 3,607,788 A | 9/1971 | Adolph |

(Continued)

FOREIGN PATENT DOCUMENTS

| CN | 1588649 | 3/2005 |
| CN | 1991868 | 7/2007 |

(Continued)

OTHER PUBLICATIONS

AADE, "AADE 37th Annual Meeting San Antonio Aug. 4-7, 2010" American Association of Diabetes Educators (2010); http://www.diabeteseducator.org/annualmeeting/2010/index.html; 2 pp.
(Continued)

*Primary Examiner* — Freshteh N Aghdam
(74) *Attorney, Agent, or Firm* — K&L Gates LLP

(57) ABSTRACT

A method may comprise receiving and sampling a signal. The signal may encode a data packet. A slice may be generated and stored comprising a pair of values for each of a selected number of samples of the signal representing a correlation of the signal to reference functions in the receiver. The presence of the data packet may then be detected and the detected packet decoded from the stored slices. The generating and storing slices may be carried out as the received signal is sampled. The sampled values of the signal may be discarded as the slices are generated and stored. The slice representation of the signal can be manipulated to generate filters with flexible bandwidth and center frequency.

18 Claims, 12 Drawing Sheets

Related U.S. Application Data

(60) Provisional application No. 61/880,786, filed on Sep. 20, 2013.

(51) Int. Cl.
*H04L 29/06* (2006.01)
*H04L 27/00* (2006.01)
*H04L 27/144* (2006.01)
*H04L 7/04* (2006.01)
*H04B 1/00* (2006.01)

(52) U.S. Cl.
CPC ........ *H04L 27/0014* (2013.01); *H04L 27/144* (2013.01); *H04L 69/22* (2013.01)

(56) References Cited

U.S. PATENT DOCUMENTS

| | | |
|---|---|---|
| 3,642,008 A | 2/1972 | Bolduc |
| 3,679,480 A | 7/1972 | Brown et al. |
| 3,682,160 A | 8/1972 | Murata |
| 3,719,183 A | 3/1973 | Schwartz |
| 3,828,766 A | 8/1974 | Krasnow |
| 3,837,339 A | 9/1974 | Aisenberg et al. |
| 3,989,050 A | 11/1976 | Buchalter |
| 4,067,014 A * | 1/1978 | Wheeler ............... G01S 1/40 342/418 |
| 4,077,397 A | 3/1978 | Ellis |
| 4,077,398 A | 3/1978 | Ellis |
| 4,082,087 A | 4/1978 | Howson |
| 4,090,752 A | 5/1978 | Long |
| 4,106,348 A | 8/1978 | Auphan |
| 4,121,573 A | 10/1978 | Crovella et al. |
| 4,129,125 A | 12/1978 | Lester |
| 4,149,168 A * | 4/1979 | Hose ................ G01S 11/02 342/458 |
| 4,166,453 A | 9/1979 | McClelland |
| 4,185,172 A * | 1/1980 | Melindo ............ H04Q 1/4575 370/241 |
| 4,239,046 A | 12/1980 | Ong |
| 4,269,189 A | 5/1981 | Abraham |
| 4,331,654 A | 5/1982 | Morris |
| 4,333,150 A * | 6/1982 | Matty ............. H04L 27/1566 340/13.2 |
| 4,345,588 A | 8/1982 | Widder et al. |
| 4,418,697 A | 12/1983 | Tama |
| 4,425,117 A | 1/1984 | Hugemann |
| 4,494,950 A | 1/1985 | Fischell |
| 4,513,385 A * | 4/1985 | Muri ................ H01Q 3/2605 342/379 |
| 4,559,950 A | 12/1985 | Vaughan |
| 4,578,061 A | 3/1986 | Lemelson |
| 4,635,641 A | 1/1987 | Hoffman |
| 4,654,165 A | 3/1987 | Eisenberg |
| 4,669,479 A | 6/1987 | Dunseath |
| 4,725,997 A | 2/1988 | Urquhart et al. |
| 4,749,575 A | 6/1988 | Rotman et al. |
| 4,763,659 A | 8/1988 | Dunseath |
| 4,784,162 A | 11/1988 | Ricks |
| 4,793,825 A | 12/1988 | Benjamin et al. |
| 4,809,705 A | 3/1989 | Ascher |
| 4,844,076 A | 7/1989 | Lesho |
| 4,858,617 A | 8/1989 | Sanders |
| 4,896,261 A | 1/1990 | Nolan |
| 4,975,230 A | 12/1990 | Pinkhasov |
| 4,987,897 A | 1/1991 | Funke |
| 5,016,634 A | 5/1991 | Vock et al. |
| 5,079,006 A | 1/1992 | Urguhart |
| 5,113,859 A | 5/1992 | Funke |
| 5,167,626 A | 12/1992 | Casper |
| 5,176,626 A | 1/1993 | Soehendra |
| 5,232,383 A | 8/1993 | Barnick |
| 5,245,332 A | 9/1993 | Katzenstein et al. |
| 5,261,402 A | 11/1993 | DiSabito |
| 5,263,481 A | 11/1993 | Axelgaard et al. |
| 5,281,287 A | 1/1994 | Lloyd |
| 5,283,136 A | 2/1994 | Peled et al. |
| 5,318,557 A | 6/1994 | Gross |
| 5,394,882 A | 3/1995 | Mawhinney |
| 5,458,141 A | 10/1995 | Neil et al. |
| 5,485,841 A | 1/1996 | Watkin et al. |
| 5,511,548 A | 4/1996 | Riazzi et al. |
| 5,551,020 A | 8/1996 | Flax et al. |
| 5,596,302 A | 1/1997 | Mastrocola et al. |
| D377,983 S | 2/1997 | Sabri et al. |
| 5,623,520 A * | 4/1997 | Kaiser ............... G01S 7/2923 375/340 |
| 5,634,466 A | 6/1997 | Gruner |
| 5,634,468 A | 6/1997 | Platt |
| 5,645,063 A | 7/1997 | Straka et al. |
| 5,720,771 A | 2/1998 | Snell |
| 5,724,432 A | 3/1998 | Bouvet et al. |
| 5,740,811 A | 4/1998 | Hedberg |
| 5,792,048 A | 8/1998 | Schaefer |
| 5,802,467 A | 9/1998 | Salazar |
| 5,833,716 A | 11/1998 | Bar-Or |
| 5,845,265 A | 12/1998 | Woolston |
| 5,862,803 A | 1/1999 | Besson |
| 5,862,808 A | 1/1999 | Albarello |
| 5,868,136 A | 2/1999 | Fox |
| 5,921,925 A | 7/1999 | Cartmell et al. |
| 5,925,030 A | 7/1999 | Gross et al. |
| 5,925,066 A | 7/1999 | Kroll et al. |
| 5,957,854 A | 9/1999 | Besson et al. |
| 5,974,124 A | 10/1999 | Schlueter, Jr. et al. |
| 5,981,166 A | 11/1999 | Mandecki |
| 5,999,846 A | 12/1999 | Pardey et al. |
| 6,023,631 A | 2/2000 | Cartmell et al. |
| 6,038,464 A | 3/2000 | Axelgaard et al. |
| 6,042,710 A | 3/2000 | Dubrow |
| 6,047,203 A | 4/2000 | Sackner |
| 6,076,016 A | 6/2000 | Feierbach |
| 6,081,734 A | 6/2000 | Batz |
| 6,095,985 A | 8/2000 | Raymond et al. |
| 6,115,636 A | 9/2000 | Ryan |
| 6,117,077 A | 9/2000 | Del Mar et al. |
| 6,122,351 A | 9/2000 | Schlueter, Jr. et al. |
| 6,141,592 A | 10/2000 | Pauly |
| 6,200,265 B1 | 3/2001 | Walsh et al. |
| 6,200,625 B1 | 3/2001 | Beckett |
| 6,204,764 B1 | 3/2001 | Maloney |
| 6,206,702 B1 | 3/2001 | Hayden et al. |
| 6,217,744 B1 | 4/2001 | Crosby |
| 6,231,593 B1 | 5/2001 | Meserol |
| 6,238,338 B1 | 5/2001 | DeLuca et al. |
| 6,245,057 B1 | 6/2001 | Sieben et al. |
| 6,275,476 B1 | 8/2001 | Wood |
| 6,285,897 B1 | 9/2001 | Kilcoyne et al. |
| 6,287,252 B1 | 9/2001 | Lugo |
| 6,289,238 B1 | 9/2001 | Besson et al. |
| 6,301,298 B1 | 10/2001 | Kuntz et al. |
| 6,315,719 B1 | 11/2001 | Rode et al. |
| 6,317,714 B1 | 11/2001 | Del Castillo |
| 6,358,202 B1 | 3/2002 | Arent |
| 6,364,834 B1 | 4/2002 | Reuss |
| 6,366,206 B1 | 4/2002 | Ishikawa et al. |
| 6,371,927 B1 | 4/2002 | Brune |
| 6,374,670 B1 | 4/2002 | Spelman |
| 6,380,858 B1 | 4/2002 | Yarin et al. |
| 6,394,953 B1 | 5/2002 | Devlin et al. |
| 6,394,997 B1 | 5/2002 | Lemelson |
| 6,409,674 B1 | 6/2002 | Brockway et al. |
| 6,426,863 B1 | 7/2002 | Munshi |
| 6,432,292 B1 | 8/2002 | Pinto et al. |
| 6,440,069 B1 | 8/2002 | Raymond et al. |
| 6,441,747 B1 | 8/2002 | Khair |
| 6,477,424 B1 | 11/2002 | Thompson et al. |
| 6,482,156 B2 | 11/2002 | Lliff |
| 6,494,829 B1 | 12/2002 | New et al. |
| 6,496,705 B1 | 12/2002 | Ng et al. |
| 6,526,315 B1 | 2/2003 | Inagawa |
| 6,544,174 B2 | 4/2003 | West |
| 6,564,079 B1 | 5/2003 | Cory |
| 6,577,893 B1 | 6/2003 | Besson et al. |

(56) References Cited

U.S. PATENT DOCUMENTS

| | | |
|---|---|---|
| 6,579,231 B1 | 6/2003 | Phipps |
| 6,605,038 B1 | 8/2003 | Teller et al. |
| 6,605,046 B1 | 8/2003 | Del Mar |
| 6,609,018 B2 | 8/2003 | Cory |
| 6,612,984 B1 | 9/2003 | Kerr |
| 6,632,175 B1 | 10/2003 | Marshall |
| 6,632,216 B2 | 10/2003 | Houzego et al. |
| 6,643,541 B2 | 11/2003 | Mok et al. |
| 6,654,638 B1 | 11/2003 | Sweeney |
| 6,663,846 B1 | 12/2003 | McCombs |
| 6,673,474 B2 | 1/2004 | Yamamoto |
| 6,680,923 B1 | 1/2004 | Leon |
| 6,689,117 B2 | 2/2004 | Sweeney et al. |
| 6,694,161 B2 | 2/2004 | Mehrotra |
| 6,704,602 B2 | 3/2004 | Berg et al. |
| 6,720,923 B1 | 4/2004 | Hayward et al. |
| 6,738,671 B2 | 5/2004 | Christophersom et al. |
| 6,740,033 B1 | 5/2004 | Olejniczak et al. |
| 6,745,082 B2 | 6/2004 | Axelgaard et al. |
| 6,755,783 B2 | 6/2004 | Cosentino |
| 6,757,523 B2 | 6/2004 | Fry |
| 6,800,060 B2 | 10/2004 | Marshall |
| 6,801,137 B2 | 10/2004 | Eggers et al. |
| 6,814,706 B2 | 11/2004 | Barton et al. |
| 6,822,554 B2 | 11/2004 | Vrijens et al. |
| 6,836,862 B1 | 12/2004 | Erekson et al. |
| 6,839,659 B2 | 1/2005 | Tarassenko et al. |
| 6,840,904 B2 | 1/2005 | Goldberg |
| 6,842,636 B2 | 1/2005 | Perrault |
| 6,845,272 B1 | 1/2005 | Thomsen |
| 6,856,832 B1 | 2/2005 | Matsumura et al. |
| 6,864,780 B2 | 3/2005 | Doi |
| 6,879,810 B2 | 4/2005 | Bouet |
| 6,882,881 B1 | 4/2005 | Lesser et al. |
| 6,889,165 B2 | 5/2005 | Lind et al. |
| 6,897,788 B2 | 5/2005 | Khair et al. |
| 6,909,878 B2 | 6/2005 | Haller |
| 6,922,592 B2 | 7/2005 | Thompson et al. |
| 6,928,370 B2 | 8/2005 | Anuzis et al. |
| 6,929,636 B1 | 8/2005 | Von Alten |
| 6,937,150 B2 | 8/2005 | Medema |
| 6,942,616 B2 | 9/2005 | Kerr |
| 6,951,536 B2 | 10/2005 | Yokoi |
| 6,956,917 B2 | 10/2005 | Lenosky |
| 6,957,107 B2 | 10/2005 | Rogers et al. |
| 6,959,929 B2 | 11/2005 | Pugnet et al. |
| 6,961,601 B2 | 11/2005 | Mathews et al. |
| 6,968,153 B1 | 11/2005 | Heinonen |
| 6,987,965 B2 | 1/2006 | Ng et al. |
| 6,990,082 B1 | 1/2006 | Zehavi et al. |
| 7,002,476 B2 | 2/2006 | Rapchak |
| 7,004,395 B2 | 2/2006 | Koenck |
| 7,009,634 B2 | 3/2006 | Iddan et al. |
| 7,009,946 B1 | 3/2006 | Kardach |
| 7,013,162 B2 | 3/2006 | Gorsuch |
| 7,016,648 B2 | 3/2006 | Haller |
| 7,020,508 B2 | 3/2006 | Stivoric |
| 7,024,248 B2 | 4/2006 | Penner et al. |
| 7,031,745 B2 | 4/2006 | Shen |
| 7,031,857 B2 | 4/2006 | Tarassenko et al. |
| 7,039,453 B2 | 5/2006 | Mullick |
| 7,046,649 B2 | 5/2006 | Awater et al. |
| 7,076,437 B1 | 7/2006 | Levy |
| 7,116,252 B2 | 10/2006 | Teraguchi |
| 7,118,531 B2 | 10/2006 | Krill |
| 7,127,300 B2 | 10/2006 | Mazar et al. |
| 7,139,332 B2 | 11/2006 | Yu et al. |
| 7,146,228 B2 | 12/2006 | Nielsen |
| 7,146,449 B2 | 12/2006 | Do et al. |
| 7,149,581 B2 | 12/2006 | Goedeke et al. |
| 7,154,071 B2 | 12/2006 | Sattler et al. |
| 7,154,916 B2 | 12/2006 | Soloff |
| 7,155,232 B2 | 12/2006 | Godfrey et al. |
| 7,160,258 B2 | 1/2007 | Imran |
| 7,161,484 B2 | 1/2007 | Tsoukalis |
| 7,164,942 B2 | 1/2007 | Avrahami |
| 7,171,166 B2 | 1/2007 | Ng et al. |
| 7,171,177 B2 | 1/2007 | Park et al. |
| 7,171,259 B2 | 1/2007 | Rytky |
| 7,187,960 B2 | 3/2007 | Abreu |
| 7,188,199 B2 | 3/2007 | Leung et al. |
| 7,188,767 B2 | 3/2007 | Penuela |
| 7,194,038 B1 | 3/2007 | Inkinen |
| 7,206,630 B1 | 4/2007 | Tarler |
| 7,209,790 B2 | 4/2007 | Thompson et al. |
| 7,215,660 B2 | 5/2007 | Perlman |
| 7,215,991 B2 | 5/2007 | Besson |
| 7,218,967 B2 | 5/2007 | Bergelson |
| 7,231,451 B2 | 6/2007 | Law |
| 7,243,118 B2 | 7/2007 | Lou |
| 7,246,521 B2 | 7/2007 | Kim |
| 7,249,212 B2 | 7/2007 | Do |
| 7,252,792 B2 | 8/2007 | Perrault |
| 7,253,716 B2 | 8/2007 | Lovoi et al. |
| 7,261,690 B2 | 8/2007 | Teller |
| 7,270,633 B1 | 9/2007 | Goscha |
| 7,273,454 B2 | 9/2007 | Raymond et al. |
| 7,283,867 B2 | 10/2007 | Strother et al. |
| 7,285,090 B2 | 10/2007 | Stivoric et al. |
| 7,289,855 B2 | 10/2007 | Nghiem |
| 7,291,497 B2 | 11/2007 | Holmes |
| 7,292,139 B2 | 11/2007 | Mazar et al. |
| 7,294,105 B1 | 11/2007 | Islam |
| 7,311,665 B2 | 12/2007 | Hawthorne |
| 7,313,163 B2 | 12/2007 | Liu |
| 7,317,378 B2 | 1/2008 | Jarvis et al. |
| 7,318,808 B2 | 1/2008 | Tarassenko et al. |
| 7,336,929 B2 | 2/2008 | Yasuda |
| 7,342,895 B2 | 3/2008 | Serpa |
| 7,346,380 B2 | 3/2008 | Axelgaard et al. |
| 7,349,722 B2 | 3/2008 | Witkowski et al. |
| 7,352,998 B2 | 4/2008 | Palin |
| 7,353,258 B2 | 4/2008 | Washburn |
| 7,357,891 B2 | 4/2008 | Yang et al. |
| 7,359,674 B2 | 4/2008 | Markki |
| 7,366,558 B2 | 4/2008 | Virtanen et al. |
| 7,373,196 B2 | 5/2008 | Ryu et al. |
| 7,375,739 B2 | 5/2008 | Robbins |
| 7,376,435 B2 | 5/2008 | McGowan |
| 7,382,247 B2 | 6/2008 | Welch et al. |
| 7,382,263 B2 | 6/2008 | Danowski et al. |
| 7,387,607 B2 | 6/2008 | Holt |
| 7,388,903 B2 | 6/2008 | Godfrey et al. |
| 7,389,088 B2 | 6/2008 | Kim |
| 7,392,015 B1 | 6/2008 | Farlow |
| 7,395,105 B2 | 7/2008 | Schmidt et al. |
| 7,395,106 B2 | 7/2008 | Ryu et al. |
| 7,396,330 B2 | 7/2008 | Banet |
| 7,404,968 B2 | 7/2008 | Abrams et al. |
| 7,413,544 B2 | 8/2008 | Kerr |
| 7,414,534 B1 | 8/2008 | Kroll et al. |
| 7,415,242 B1 | 8/2008 | Ngan |
| 7,424,268 B2 | 9/2008 | Diener |
| 7,424,319 B2 | 9/2008 | Muehlsteff |
| 7,427,266 B2 | 9/2008 | Ayer et al. |
| 7,471,665 B2 | 12/2008 | Perlman |
| 7,499,674 B2 | 3/2009 | Salokannel |
| 7,502,643 B2 | 3/2009 | Farringdon et al. |
| 7,505,795 B1 | 3/2009 | Lim et al. |
| 7,510,121 B2 | 3/2009 | Koenck |
| 7,512,448 B2 | 3/2009 | Malick |
| 7,515,043 B2 | 4/2009 | Welch |
| 7,523,756 B2 | 4/2009 | Minai |
| 7,525,426 B2 | 4/2009 | Edelstein |
| 7,539,533 B2 | 5/2009 | Tran |
| 7,542,878 B2 | 6/2009 | Nanikashvili |
| 7,547,278 B2 | 6/2009 | Miyazaki et al. |
| 7,551,590 B2 | 6/2009 | Haller |
| 7,554,452 B2 | 6/2009 | Cole |
| 7,575,005 B2 | 8/2009 | Mumford |
| 7,599,003 B2 | 10/2009 | Suzuki et al. |
| 7,616,111 B2 | 11/2009 | Covannon |
| 7,616,710 B2 | 11/2009 | Kim et al. |
| 7,617,001 B2 | 11/2009 | Penner et al. |

(56) References Cited

U.S. PATENT DOCUMENTS

| | | |
|---|---|---|
| 7,626,387 B2 | 12/2009 | Adachi |
| 7,640,802 B2 | 1/2010 | King et al. |
| 7,647,112 B2 | 1/2010 | Tracey |
| 7,647,185 B2 | 1/2010 | Tarassenko et al. |
| 7,653,031 B2 | 1/2010 | Godfrey et al. |
| 7,668,437 B1 | 2/2010 | Yamada et al. |
| 7,672,703 B2 | 3/2010 | Yeo et al. |
| 7,672,714 B2 | 3/2010 | Kuo |
| 7,673,679 B2 | 3/2010 | Harrison et al. |
| 7,678,043 B2 | 3/2010 | Gilad |
| 7,688,204 B2 | 3/2010 | Yamanaka et al. |
| 7,689,437 B1 | 3/2010 | Teller et al. |
| 7,697,994 B2 | 4/2010 | VanDanacker et al. |
| 7,720,036 B2 | 5/2010 | Sadri |
| 7,729,776 B2 | 6/2010 | Von Arx et al. |
| 7,733,224 B2 | 6/2010 | Tran |
| 7,736,318 B2 | 6/2010 | Cosentino |
| 7,756,587 B2 | 7/2010 | Penner et al. |
| 7,782,991 B2 | 8/2010 | Sobchak et al. |
| 7,797,033 B2 | 9/2010 | D'Andrea et al. |
| 7,809,399 B2 | 10/2010 | Lu |
| 7,844,341 B2 | 11/2010 | Von Arx et al. |
| 7,904,133 B2 | 3/2011 | Gehman et al. |
| D639,437 S | 6/2011 | Bishay et al. |
| 7,978,064 B2 | 7/2011 | Zdeblick et al. |
| 7,983,189 B2 | 7/2011 | Bugenhagen |
| 8,036,748 B2 | 10/2011 | Zdeblick et al. |
| 8,055,334 B2 | 11/2011 | Savage et al. |
| 8,073,707 B2 | 12/2011 | Teller et al. |
| 8,083,128 B2 | 12/2011 | Dembo et al. |
| 8,114,021 B2 | 2/2012 | Robertson et al. |
| 8,123,576 B2 | 2/2012 | Kim |
| 8,140,143 B2 | 3/2012 | Picard et al. |
| 8,170,515 B2 | 5/2012 | Le Reverend et al. |
| 8,180,425 B2 | 5/2012 | Selvitelli et al. |
| 8,184,854 B2 | 5/2012 | Bartsch |
| 8,185,191 B1 | 5/2012 | Shapiro et al. |
| 8,185,646 B2 | 5/2012 | Headley |
| 8,193,821 B2 | 6/2012 | Mueller |
| 8,200,320 B2 | 6/2012 | Kovacs |
| 8,214,007 B2 | 7/2012 | Baker et al. |
| 8,238,998 B2 | 8/2012 | Park |
| 8,249,686 B2 | 8/2012 | Libbus et al. |
| 8,254,853 B2 | 8/2012 | Rofougaran |
| 8,285,356 B2 | 10/2012 | Bly et al. |
| 8,290,574 B2 | 10/2012 | Felid et al. |
| 8,301,232 B2 | 10/2012 | Albert et al. |
| 8,308,640 B2 | 11/2012 | Baldus et al. |
| 8,315,687 B2 | 11/2012 | Cross et al. |
| 8,332,009 B2 | 12/2012 | McLaughlin et al. |
| 8,360,976 B2 | 1/2013 | Imran |
| 8,369,936 B2 | 2/2013 | Farringdon et al. |
| 8,386,009 B2 | 2/2013 | Lindberg et al. |
| 8,404,275 B2 | 3/2013 | Habboushe |
| 8,440,274 B2 | 5/2013 | Wang |
| 8,454,528 B2 | 6/2013 | Yuen et al. |
| 8,471,960 B2 | 6/2013 | Lin et al. |
| 8,514,979 B2 | 8/2013 | Laporte |
| 8,538,544 B2 | 9/2013 | Sivard |
| 8,548,033 B2 | 10/2013 | Nemeth et al. |
| 8,604,974 B2 | 12/2013 | Ganeshan |
| 8,615,290 B2 | 12/2013 | Lin et al. |
| 8,620,402 B2 | 12/2013 | Parker, III et al. |
| 8,634,838 B2 | 1/2014 | Hellwig et al. |
| 8,660,645 B2 | 2/2014 | Stevenson et al. |
| 8,754,799 B2 | 6/2014 | Coln et al. |
| 8,773,258 B2 | 7/2014 | Vosch et al. |
| 8,836,513 B2 | 9/2014 | Hafezi et al. |
| 8,838,217 B2 | 9/2014 | Myr |
| 8,858,432 B2 | 10/2014 | Robertson |
| 8,908,943 B2 | 12/2014 | Berry et al. |
| 8,926,509 B2 | 1/2015 | Magar et al. |
| 8,932,221 B2 | 1/2015 | Colliou et al. |
| 8,945,005 B2 | 2/2015 | Hafezi et al. |
| 8,989,837 B2 | 3/2015 | Weinstein et al. |
| 9,014,779 B2 | 4/2015 | Zdeblick et al. |
| 9,031,658 B2 | 5/2015 | Chiao et al. |
| 9,149,577 B2 | 10/2015 | Robertson et al. |
| 9,158,890 B2 | 10/2015 | Meredith et al. |
| 9,189,941 B2 | 11/2015 | Eschelman et al. |
| 9,226,663 B2 | 1/2016 | Fei |
| 9,226,679 B2 | 1/2016 | Balda |
| 9,270,503 B2 | 2/2016 | Kushner et al. |
| 9,277,864 B2 | 3/2016 | Yang et al. |
| 9,439,566 B2 | 9/2016 | Arne et al. |
| 9,439,599 B2 | 9/2016 | Thompson et al. |
| 9,517,012 B2 | 12/2016 | Lane et al. |
| 2001/0027331 A1 | 10/2001 | Thompson |
| 2001/0031071 A1 | 10/2001 | Nichols et al. |
| 2001/0044588 A1 | 11/2001 | Mault |
| 2001/0051766 A1 | 12/2001 | Gazdinski |
| 2001/0056262 A1 | 12/2001 | Cabiri et al. |
| 2002/0002326 A1 | 1/2002 | Causey et al. |
| 2002/0026111 A1 | 2/2002 | Ackerman |
| 2002/0040278 A1 | 4/2002 | Anuzis et al. |
| 2002/0077620 A1 | 6/2002 | Sweeney et al. |
| 2002/0132226 A1 | 9/2002 | Nair |
| 2002/0169696 A1 | 11/2002 | Zara |
| 2002/0192159 A1 | 12/2002 | Reitberg |
| 2002/0193669 A1 | 12/2002 | Glukhovsky |
| 2002/0198470 A1 | 12/2002 | Imran et al. |
| 2003/0017826 A1 | 1/2003 | Fishman |
| 2003/0023150 A1 | 1/2003 | Yokoi et al. |
| 2003/0028226 A1 | 2/2003 | Thompson |
| 2003/0065536 A1 | 4/2003 | Hansen |
| 2003/0076179 A1 | 4/2003 | Branch et al. |
| 2003/0083559 A1 | 5/2003 | Thompson |
| 2003/0091121 A1 | 5/2003 | Kenmochi |
| 2003/0126593 A1 | 7/2003 | Mault |
| 2003/0130714 A1 | 7/2003 | Nielsen et al. |
| 2003/0135128 A1 | 7/2003 | Suffin et al. |
| 2003/0135392 A1 | 7/2003 | Vrijens et al. |
| 2003/0152622 A1 | 8/2003 | Louie-Helm et al. |
| 2003/0158466 A1 | 8/2003 | Lynn et al. |
| 2003/0158756 A1 | 8/2003 | Abramson |
| 2003/0162556 A1 | 8/2003 | Libes |
| 2003/0164401 A1 | 9/2003 | Andreasson et al. |
| 2003/0167000 A1 | 9/2003 | Mullick et al. |
| 2003/0171791 A1 | 9/2003 | KenKnight |
| 2003/0171898 A1 | 9/2003 | Tarassenko et al. |
| 2003/0181788 A1 | 9/2003 | Yokoi et al. |
| 2003/0181815 A1 | 9/2003 | Ebner et al. |
| 2003/0185286 A1 | 10/2003 | Yuen |
| 2003/0187337 A1 | 10/2003 | Tarassenko et al. |
| 2003/0187338 A1 | 10/2003 | Say et al. |
| 2003/0195403 A1 | 10/2003 | Berner et al. |
| 2003/0213495 A1 | 11/2003 | Fujita et al. |
| 2003/0214579 A1 | 11/2003 | Iddan |
| 2003/0216622 A1 | 11/2003 | Meron et al. |
| 2003/0216625 A1 | 11/2003 | Phipps |
| 2003/0216666 A1 | 11/2003 | Ericson et al. |
| 2003/0216729 A1 | 11/2003 | Marchitto |
| 2003/0229382 A1 | 12/2003 | Sun et al. |
| 2004/0008123 A1 | 1/2004 | Carrender et al. |
| 2004/0018476 A1 | 1/2004 | LaDue |
| 2004/0019172 A1 | 1/2004 | Yang et al. |
| 2004/0034295 A1 | 2/2004 | Salganicoff |
| 2004/0049245 A1 | 3/2004 | Gass |
| 2004/0073095 A1 | 4/2004 | Causey et al. |
| 2004/0073454 A1 | 4/2004 | Urquhart et al. |
| 2004/0077995 A1 | 4/2004 | Ferek-Petric |
| 2004/0082982 A1 | 4/2004 | Gord et al. |
| 2004/0087839 A1 | 5/2004 | Raymond et al. |
| 2004/0092801 A1 | 5/2004 | Drakulic |
| 2004/0106859 A1 | 6/2004 | Say et al. |
| 2004/0115507 A1 | 6/2004 | Potter et al. |
| 2004/0115517 A1 | 6/2004 | Fukada et al. |
| 2004/0121015 A1 | 6/2004 | Chidlaw et al. |
| 2004/0122297 A1 | 6/2004 | Stahmann et al. |
| 2004/0148140 A1 | 7/2004 | Tarassenko et al. |
| 2004/0153007 A1 | 8/2004 | Harris |
| 2004/0167226 A1 | 8/2004 | Serafini |
| 2004/0167801 A1 | 8/2004 | Say et al. |
| 2004/0193020 A1 | 9/2004 | Chiba |

(56) References Cited

U.S. PATENT DOCUMENTS

| | | |
|---|---|---|
| 2004/0193029 A1 | 9/2004 | Gluhovsky |
| 2004/0193446 A1 | 9/2004 | Mayer et al. |
| 2004/0199222 A1 | 10/2004 | Sun et al. |
| 2004/0215084 A1 | 10/2004 | Shimizu et al. |
| 2004/0218683 A1 | 11/2004 | Batra |
| 2004/0220643 A1 | 11/2004 | Schmidt |
| 2004/0224644 A1 | 11/2004 | Wu |
| 2004/0225199 A1 | 11/2004 | Evanyk |
| 2004/0253304 A1 | 12/2004 | Gross et al. |
| 2004/0260154 A1 | 12/2004 | Sidelnik |
| 2005/0010338 A1 | 1/2005 | Kraeling et al. |
| 2005/0017841 A1 | 1/2005 | Doi |
| 2005/0020887 A1 | 1/2005 | Goldberg |
| 2005/0021103 A1 | 1/2005 | DiLorenzo |
| 2005/0021370 A1 | 1/2005 | Riff |
| 2005/0024198 A1 | 2/2005 | Ward |
| 2005/0027205 A1 | 2/2005 | Tarassenko et al. |
| 2005/0038321 A1 | 2/2005 | Fujita et al. |
| 2005/0043634 A1 | 2/2005 | Yokoi et al. |
| 2005/0055014 A1 | 3/2005 | Coppeta et al. |
| 2005/0062644 A1 | 3/2005 | Leci |
| 2005/0065407 A1 | 3/2005 | Nakamura et al. |
| 2005/0070778 A1 | 3/2005 | Lackey |
| 2005/0092108 A1 | 5/2005 | Andermo |
| 2005/0096514 A1 | 5/2005 | Starkebaum |
| 2005/0096562 A1 | 5/2005 | Delalic et al. |
| 2005/0101843 A1 | 5/2005 | Quinn |
| 2005/0101872 A1 | 5/2005 | Sattler |
| 2005/0115561 A1 | 6/2005 | Stahmann et al. |
| 2005/0116820 A1 | 6/2005 | Goldreich |
| 2005/0117389 A1 | 6/2005 | Worledge |
| 2005/0121322 A1 | 6/2005 | Say et al. |
| 2005/0131281 A1 | 6/2005 | Ayer et al. |
| 2005/0137480 A1 | 6/2005 | Alt et al. |
| 2005/0143623 A1 | 6/2005 | Kojima |
| 2005/0148883 A1 | 7/2005 | Boesen |
| 2005/0154428 A1 | 7/2005 | Bruinsma |
| 2005/0165323 A1 | 7/2005 | Montgomery |
| 2005/0177069 A1 | 8/2005 | Takizawa |
| 2005/0182389 A1 | 8/2005 | LaPorte |
| 2005/0187789 A1 | 8/2005 | Hatlestad et al. |
| 2005/0192489 A1 | 9/2005 | Marshall |
| 2005/0197680 A1 | 9/2005 | DelMain et al. |
| 2005/0228268 A1 | 10/2005 | Cole |
| 2005/0234307 A1 | 10/2005 | Heinonen |
| 2005/0240305 A1 | 10/2005 | Bogash et al. |
| 2005/0245794 A1 | 11/2005 | Dinsmoor |
| 2005/0259768 A1 | 11/2005 | Yang et al. |
| 2005/0261559 A1 | 11/2005 | Mumford |
| 2005/0267556 A1 | 12/2005 | Shuros et al. |
| 2005/0267756 A1 | 12/2005 | Schultz et al. |
| 2005/0277912 A1 | 12/2005 | John |
| 2005/0277999 A1 | 12/2005 | Strother et al. |
| 2005/0285746 A1 | 12/2005 | Sengupta |
| 2005/0288594 A1 | 12/2005 | Lewkowicz et al. |
| 2006/0001496 A1 | 1/2006 | Abrosimov et al. |
| 2006/0036134 A1 | 2/2006 | Tarassenko et al. |
| 2006/0061472 A1 | 3/2006 | Lovoi et al. |
| 2006/0065713 A1 | 3/2006 | Kingery |
| 2006/0074283 A1 | 4/2006 | Henderson |
| 2006/0078765 A1 | 4/2006 | Yang et al. |
| 2006/0095091 A1 | 5/2006 | Drew |
| 2006/0095093 A1 | 5/2006 | Bettesh et al. |
| 2006/0100533 A1 | 5/2006 | Han |
| 2006/0109058 A1 | 5/2006 | Keating |
| 2006/0110962 A1 | 5/2006 | Powell |
| 2006/0122474 A1 | 6/2006 | Teller et al. |
| 2006/0122667 A1 | 6/2006 | Chavan et al. |
| 2006/0129060 A1 | 6/2006 | Lee et al. |
| 2006/0136266 A1 | 6/2006 | Tarassenko et al. |
| 2006/0136744 A1 | 6/2006 | Lange |
| 2006/0142648 A1 | 6/2006 | Banet |
| 2006/0145876 A1 | 7/2006 | Kimura |
| 2006/0148254 A1 | 7/2006 | McLean |
| 2006/0149339 A1 | 7/2006 | Burnes |
| 2006/0155174 A1 | 7/2006 | Glukhovsky et al. |
| 2006/0155183 A1 | 7/2006 | Kroecker |
| 2006/0158820 A1 | 7/2006 | Takiguchi |
| 2006/0161225 A1 | 7/2006 | Sormann et al. |
| 2006/0179949 A1 | 8/2006 | Kim |
| 2006/0183993 A1 | 8/2006 | Horn |
| 2006/0184092 A1 | 8/2006 | Atanasoska et al. |
| 2006/0204738 A1 | 9/2006 | Dubrow et al. |
| 2006/0210626 A1 | 9/2006 | Spaeder |
| 2006/0216603 A1 | 9/2006 | Choi |
| 2006/0218011 A1 | 9/2006 | Walker |
| 2006/0235489 A1 | 10/2006 | Drew |
| 2006/0243288 A1 | 11/2006 | Kim et al. |
| 2006/0247505 A1 | 11/2006 | Siddiqui |
| 2006/0253005 A1 | 11/2006 | Drinan |
| 2006/0255064 A1 | 11/2006 | Donaldson |
| 2006/0265246 A1 | 11/2006 | Hoag |
| 2006/0270346 A1 | 11/2006 | Ibrahim |
| 2006/0277097 A1 | 12/2006 | Shafron et al. |
| 2006/0280227 A1 | 12/2006 | Pinkney |
| 2006/0282001 A1 | 12/2006 | Noel |
| 2006/0289640 A1 | 12/2006 | Mercure |
| 2006/0293607 A1 | 12/2006 | Alt |
| 2007/0002038 A1 | 1/2007 | Suzuki |
| 2007/0006636 A1 | 1/2007 | King et al. |
| 2007/0008113 A1 | 1/2007 | Spoonhower et al. |
| 2007/0016089 A1 | 1/2007 | Fischell et al. |
| 2007/0027386 A1 | 2/2007 | Such |
| 2007/0027388 A1 | 2/2007 | Chou |
| 2007/0038054 A1 | 2/2007 | Zhou |
| 2007/0049339 A1 | 3/2007 | Barak et al. |
| 2007/0055098 A1 | 3/2007 | Shimizu et al. |
| 2007/0060797 A1 | 3/2007 | Ball |
| 2007/0073353 A1 | 3/2007 | Rooney et al. |
| 2007/0096765 A1 | 5/2007 | Kagan |
| 2007/0106346 A1 | 5/2007 | Bergelson |
| 2007/0123772 A1 | 5/2007 | Euliano |
| 2007/0129622 A1 | 6/2007 | Bourget |
| 2007/0130287 A1 | 6/2007 | Kumar |
| 2007/0135803 A1 | 6/2007 | Belson |
| 2007/0142721 A1 | 6/2007 | Berner et al. |
| 2007/0156016 A1 | 7/2007 | Betesh |
| 2007/0162089 A1 | 7/2007 | Mosesov |
| 2007/0162090 A1 | 7/2007 | Penner |
| 2007/0167495 A1 | 7/2007 | Brown et al. |
| 2007/0167848 A1 | 7/2007 | Kuo et al. |
| 2007/0173701 A1 | 7/2007 | Al-Ali |
| 2007/0179347 A1 | 8/2007 | Tarassenko et al. |
| 2007/0180047 A1 | 8/2007 | Dong et al. |
| 2007/0185393 A1 | 8/2007 | Zhou |
| 2007/0191002 A1 | 8/2007 | Ge |
| 2007/0196456 A1 | 8/2007 | Stevens |
| 2007/0207793 A1 | 9/2007 | Myer |
| 2007/0213659 A1 | 9/2007 | Trovato et al. |
| 2007/0237719 A1 | 10/2007 | Jones |
| 2007/0244370 A1 | 10/2007 | Kuo et al. |
| 2007/0249946 A1 | 10/2007 | Kumar et al. |
| 2007/0255198 A1 | 11/2007 | Leong et al. |
| 2007/0255330 A1 | 11/2007 | Lee |
| 2007/0270672 A1 | 11/2007 | Hayter |
| 2007/0279217 A1 | 12/2007 | Venkatraman |
| 2007/0282174 A1 | 12/2007 | Sabatino |
| 2007/0282177 A1 | 12/2007 | Pilz |
| 2007/0291715 A1 | 12/2007 | Laroia et al. |
| 2007/0299480 A1 | 12/2007 | Hill |
| 2008/0014866 A1 | 1/2008 | Lipowski |
| 2008/0015421 A1 | 1/2008 | Penner |
| 2008/0015494 A1 | 1/2008 | Santini et al. |
| 2008/0020037 A1 | 1/2008 | Robertson et al. |
| 2008/0021519 A1 | 1/2008 | DeGeest |
| 2008/0021521 A1 | 1/2008 | Shah |
| 2008/0027679 A1 | 1/2008 | Shklarski |
| 2008/0033273 A1 | 2/2008 | Zhou |
| 2008/0045843 A1 | 2/2008 | Tsuji et al. |
| 2008/0046038 A1 | 2/2008 | Hill |
| 2008/0051667 A1 | 2/2008 | Goldreich |
| 2008/0051767 A1 | 2/2008 | Rossing et al. |
| 2008/0058614 A1 | 3/2008 | Banet |
| 2008/0062856 A1 | 3/2008 | Feher |

(56) References Cited

U.S. PATENT DOCUMENTS

| | | |
|---|---|---|
| 2008/0065168 A1 | 3/2008 | Bitton et al. |
| 2008/0074307 A1 | 3/2008 | Boric-Lubecke |
| 2008/0077015 A1 | 3/2008 | Boric-Lubecke |
| 2008/0077028 A1 | 3/2008 | Schaldach et al. |
| 2008/0077188 A1 | 3/2008 | Denker et al. |
| 2008/0091089 A1 | 4/2008 | Guillory et al. |
| 2008/0091114 A1 | 4/2008 | Min |
| 2008/0097549 A1 | 4/2008 | Colbaugh |
| 2008/0097917 A1 | 4/2008 | Dicks |
| 2008/0099366 A1 | 5/2008 | Niemic et al. |
| 2008/0103440 A1 | 5/2008 | Ferren et al. |
| 2008/0112885 A1 | 5/2008 | Okunev et al. |
| 2008/0114224 A1 | 5/2008 | Bandy et al. |
| 2008/0119705 A1 | 5/2008 | Patel |
| 2008/0119716 A1 | 5/2008 | Boric-Lubecke |
| 2008/0137566 A1 | 6/2008 | Marholev |
| 2008/0139907 A1 | 6/2008 | Rao et al. |
| 2008/0140403 A1 | 6/2008 | Hughes et al. |
| 2008/0146871 A1 | 6/2008 | Arneson et al. |
| 2008/0146889 A1 | 6/2008 | Young |
| 2008/0146892 A1 | 6/2008 | LeBeouf |
| 2008/0154104 A1 | 6/2008 | Lamego |
| 2008/0166992 A1 | 7/2008 | Ricordi |
| 2008/0183245 A1 | 7/2008 | Van Oort |
| 2008/0188837 A1 | 8/2008 | Belsky et al. |
| 2008/0194912 A1 | 8/2008 | Trovato et al. |
| 2008/0208009 A1 | 8/2008 | Shklarski |
| 2008/0214901 A1 | 9/2008 | Gehman |
| 2008/0214985 A1 | 9/2008 | Yanaki |
| 2008/0243020 A1 | 10/2008 | Chou |
| 2008/0249360 A1 | 10/2008 | Li |
| 2008/0262320 A1 | 10/2008 | Schaefer et al. |
| 2008/0262336 A1 | 10/2008 | Ryu |
| 2008/0269664 A1 | 10/2008 | Trovato et al. |
| 2008/0275312 A1 | 11/2008 | Mosesov |
| 2008/0284599 A1 | 11/2008 | Zdeblick et al. |
| 2008/0288026 A1 | 11/2008 | Cross et al. |
| 2008/0288027 A1 | 11/2008 | Kroll |
| 2008/0294020 A1 | 11/2008 | Sapounas |
| 2008/0300572 A1 | 12/2008 | Rankers |
| 2008/0303638 A1 | 12/2008 | Nguyen |
| 2008/0306357 A1 | 12/2008 | Korman |
| 2008/0306359 A1 | 12/2008 | Zdeblick et al. |
| 2008/0306360 A1 | 12/2008 | Robertson et al. |
| 2008/0306362 A1 | 12/2008 | Davis |
| 2008/0311852 A1 | 12/2008 | Hansen |
| 2008/0312522 A1 | 12/2008 | Rowlandson |
| 2008/0316020 A1 | 12/2008 | Robertson |
| 2009/0009332 A1 | 1/2009 | Nunez et al. |
| 2009/0024045 A1 | 1/2009 | Prakash |
| 2009/0030293 A1 | 1/2009 | Cooper et al. |
| 2009/0030297 A1 | 1/2009 | Miller |
| 2009/0034209 A1 | 2/2009 | Joo |
| 2009/0043171 A1 | 2/2009 | Rule |
| 2009/0048498 A1 | 2/2009 | Riskey |
| 2009/0062634 A1 | 3/2009 | Say et al. |
| 2009/0062670 A1 | 3/2009 | Sterling |
| 2009/0062730 A1 | 3/2009 | Woo |
| 2009/0069642 A1 | 3/2009 | Gao |
| 2009/0069655 A1 | 3/2009 | Say et al. |
| 2009/0069656 A1 | 3/2009 | Say et al. |
| 2009/0069657 A1 | 3/2009 | Say et al. |
| 2009/0069658 A1 | 3/2009 | Say et al. |
| 2009/0069724 A1 | 3/2009 | Otto et al. |
| 2009/0076340 A1 | 3/2009 | Libbus et al. |
| 2009/0076343 A1 | 3/2009 | James |
| 2009/0076350 A1 | 3/2009 | Bly et al. |
| 2009/0076397 A1 | 3/2009 | Libbus et al. |
| 2009/0082645 A1 | 3/2009 | Hafezi et al. |
| 2009/0088618 A1 | 4/2009 | Arneson |
| 2009/0099435 A1 | 4/2009 | Say et al. |
| 2009/0110148 A1 | 4/2009 | Zhang |
| 2009/0112626 A1 | 4/2009 | Talbot |
| 2009/0124871 A1 | 5/2009 | Arshak |
| 2009/0131774 A1 | 5/2009 | Sweitzer |
| 2009/0135886 A1 | 5/2009 | Robertson et al. |
| 2009/0157113 A1 | 6/2009 | Marcotte |
| 2009/0157358 A1 | 6/2009 | Kim |
| 2009/0161602 A1 | 6/2009 | Matsumoto |
| 2009/0163789 A1 | 6/2009 | Say et al. |
| 2009/0171180 A1 | 7/2009 | Pering |
| 2009/0173628 A1 | 7/2009 | Say et al. |
| 2009/0177055 A1 | 7/2009 | Say et al. |
| 2009/0177056 A1 | 7/2009 | Say et al. |
| 2009/0177057 A1 | 7/2009 | Say et al. |
| 2009/0177058 A1 | 7/2009 | Say et al. |
| 2009/0177059 A1 | 7/2009 | Say et al. |
| 2009/0177060 A1 | 7/2009 | Say et al. |
| 2009/0177061 A1 | 7/2009 | Say et al. |
| 2009/0177062 A1 | 7/2009 | Say et al. |
| 2009/0177063 A1 | 7/2009 | Say et al. |
| 2009/0177064 A1 | 7/2009 | Say et al. |
| 2009/0177065 A1 | 7/2009 | Say et al. |
| 2009/0177066 A1 | 7/2009 | Say et al. |
| 2009/0182206 A1 | 7/2009 | Najafi |
| 2009/0182212 A1 | 7/2009 | Say et al. |
| 2009/0182213 A1 | 7/2009 | Say et al. |
| 2009/0182214 A1 | 7/2009 | Say et al. |
| 2009/0182215 A1 | 7/2009 | Say et al. |
| 2009/0182388 A1 | 7/2009 | Von Arx |
| 2009/0187088 A1 | 7/2009 | Say et al. |
| 2009/0187089 A1 | 7/2009 | Say et al. |
| 2009/0187090 A1 | 7/2009 | Say et al. |
| 2009/0187091 A1 | 7/2009 | Say et al. |
| 2009/0187092 A1 | 7/2009 | Say et al. |
| 2009/0187093 A1 | 7/2009 | Say et al. |
| 2009/0187094 A1 | 7/2009 | Say et al. |
| 2009/0187095 A1 | 7/2009 | Say et al. |
| 2009/0187381 A1 | 7/2009 | King et al. |
| 2009/0192351 A1 | 7/2009 | Nishino |
| 2009/0192368 A1 | 7/2009 | Say et al. |
| 2009/0192369 A1 | 7/2009 | Say et al. |
| 2009/0192370 A1 | 7/2009 | Say et al. |
| 2009/0192371 A1 | 7/2009 | Say et al. |
| 2009/0192372 A1 | 7/2009 | Say et al. |
| 2009/0192373 A1 | 7/2009 | Say et al. |
| 2009/0192374 A1 | 7/2009 | Say et al. |
| 2009/0192375 A1 | 7/2009 | Say et al. |
| 2009/0192376 A1 | 7/2009 | Say et al. |
| 2009/0192377 A1 | 7/2009 | Say et al. |
| 2009/0192378 A1 | 7/2009 | Say et al. |
| 2009/0192379 A1 | 7/2009 | Say et al. |
| 2009/0198115 A1 | 8/2009 | Say et al. |
| 2009/0198116 A1 | 8/2009 | Say et al. |
| 2009/0198175 A1 | 8/2009 | Say et al. |
| 2009/0203964 A1 | 8/2009 | Shimizu et al. |
| 2009/0203971 A1 | 8/2009 | Sciarappa |
| 2009/0203972 A1 | 8/2009 | Heneghan |
| 2009/0203978 A1 | 8/2009 | Say et al. |
| 2009/0204265 A1 | 8/2009 | Hackett |
| 2009/0210164 A1 | 8/2009 | Say et al. |
| 2009/0216101 A1 | 8/2009 | Say et al. |
| 2009/0216102 A1 | 8/2009 | Say et al. |
| 2009/0227204 A1 | 9/2009 | Robertson et al. |
| 2009/0227876 A1 | 9/2009 | Tran |
| 2009/0227940 A1 | 9/2009 | Say et al. |
| 2009/0227941 A1 | 9/2009 | Say et al. |
| 2009/0228214 A1 | 9/2009 | Say et al. |
| 2009/0231125 A1 | 9/2009 | Baldus |
| 2009/0234200 A1 | 9/2009 | Husheer |
| 2009/0243833 A1 | 10/2009 | Huang |
| 2009/0253960 A1 | 10/2009 | Takenaka et al. |
| 2009/0256702 A1 | 10/2009 | Robertson |
| 2009/0264714 A1 | 10/2009 | Chou |
| 2009/0264964 A1 | 10/2009 | Abrahamson |
| 2009/0265186 A1 | 10/2009 | Tarassenko et al. |
| 2009/0273467 A1 | 11/2009 | Elixmann |
| 2009/0281539 A1 | 11/2009 | Selig |
| 2009/0287109 A1 | 11/2009 | Ferren et al. |
| 2009/0292194 A1 | 11/2009 | Libbus et al. |
| 2009/0295548 A1 | 12/2009 | Ronkka |
| 2009/0296677 A1 | 12/2009 | Mahany |
| 2009/0301925 A1 | 12/2009 | Alloro et al. |
| 2009/0303920 A1 | 12/2009 | Mahany |

(56) References Cited

U.S. PATENT DOCUMENTS

| | | |
|---|---|---|
| 2009/0312619 A1 | 12/2009 | Say et al. |
| 2009/0318761 A1 | 12/2009 | Rabinovitz |
| 2009/0318779 A1 | 12/2009 | Tran |
| 2009/0318783 A1 | 12/2009 | Rohde |
| 2009/0318793 A1 | 12/2009 | Datta |
| 2010/0010330 A1 | 1/2010 | Rankers |
| 2010/0033324 A1 | 2/2010 | Shimizu et al. |
| 2010/0036269 A1 | 2/2010 | Ferren et al. |
| 2010/0049006 A1 | 2/2010 | Magar |
| 2010/0049012 A1 | 2/2010 | Dijksman et al. |
| 2010/0049069 A1 | 2/2010 | Tarassenko et al. |
| 2010/0049263 A1 | 2/2010 | Reeve |
| 2010/0056878 A1 | 3/2010 | Partin |
| 2010/0056891 A1 | 3/2010 | Say et al. |
| 2010/0056939 A1 | 3/2010 | Tarassenko et al. |
| 2010/0057041 A1 | 3/2010 | Hayter |
| 2010/0062709 A1 | 3/2010 | Kato |
| 2010/0063438 A1 | 3/2010 | Bengtsson |
| 2010/0063841 A1 | 3/2010 | D'Ambrosia et al. |
| 2010/0069002 A1 | 3/2010 | Rong |
| 2010/0069717 A1 | 3/2010 | Hafezi et al. |
| 2010/0099967 A1 | 4/2010 | Say et al. |
| 2010/0099968 A1 | 4/2010 | Say et al. |
| 2010/0099969 A1 | 4/2010 | Say et al. |
| 2010/0100077 A1 | 4/2010 | Rush |
| 2010/0100078 A1 | 4/2010 | Say et al. |
| 2010/0106001 A1 | 4/2010 | Say et al. |
| 2010/0118853 A1 | 5/2010 | Godfrey |
| 2010/0139672 A1 | 6/2010 | Kroll et al. |
| 2010/0160742 A1 | 6/2010 | Seidl et al. |
| 2010/0168659 A1 | 7/2010 | Say et al. |
| 2010/0179398 A1 | 7/2010 | Say et al. |
| 2010/0191073 A1 | 7/2010 | Tarassenko et al. |
| 2010/0210299 A1 | 8/2010 | Gorbachov |
| 2010/0222652 A1 | 9/2010 | Cho |
| 2010/0228113 A1 | 9/2010 | Solosko |
| 2010/0234706 A1 | 9/2010 | Gilland |
| 2010/0234715 A1 | 9/2010 | Shin |
| 2010/0234914 A1 | 9/2010 | Shen |
| 2010/0245091 A1 | 9/2010 | Singh |
| 2010/0249541 A1 | 9/2010 | Geva et al. |
| 2010/0249881 A1 | 9/2010 | Corndorf |
| 2010/0256461 A1 | 10/2010 | Mohamedali |
| 2010/0259543 A1 | 10/2010 | Tarassenko et al. |
| 2010/0268048 A1 | 10/2010 | Say et al. |
| 2010/0268049 A1 | 10/2010 | Say et al. |
| 2010/0268050 A1 | 10/2010 | Say et al. |
| 2010/0274111 A1 | 10/2010 | Say et al. |
| 2010/0280345 A1 | 11/2010 | Say et al. |
| 2010/0280346 A1 | 11/2010 | Say et al. |
| 2010/0298650 A1 | 11/2010 | Moon et al. |
| 2010/0298730 A1 | 11/2010 | Tarassenko et al. |
| 2010/0311482 A1 | 12/2010 | Lange |
| 2010/0312580 A1 | 12/2010 | Tarassenko et al. |
| 2011/0004079 A1 | 1/2011 | Al Ali et al. |
| 2011/0065983 A1 | 3/2011 | Hafezi et al. |
| 2011/0081860 A1 | 4/2011 | Brown et al. |
| 2011/0124983 A1 | 5/2011 | Kroll et al. |
| 2011/0134906 A1 | 6/2011 | Garudadri et al. |
| 2011/0144470 A1 | 6/2011 | Mazar et al. |
| 2011/0160549 A1 | 6/2011 | Saroka et al. |
| 2011/0166937 A1 | 7/2011 | Bangera et al. |
| 2011/0237924 A1 | 9/2011 | McGusty et al. |
| 2011/0270135 A1 | 11/2011 | Dooley et al. |
| 2011/0279963 A1 | 11/2011 | Kumar et al. |
| 2012/0016231 A1 | 1/2012 | Westmoreland |
| 2012/0029307 A1 | 2/2012 | Paquet et al. |
| 2012/0029309 A1 | 2/2012 | Paquet et al. |
| 2012/0071743 A1 | 3/2012 | Todorov et al. |
| 2012/0083715 A1 | 4/2012 | Yuen et al. |
| 2012/0089000 A1 | 4/2012 | Bishay et al. |
| 2012/0101396 A1 | 4/2012 | Solosko et al. |
| 2012/0179004 A1 | 7/2012 | Roesicke et al. |
| 2012/0197144 A1 | 8/2012 | Christ et al. |
| 2012/0299723 A1 | 11/2012 | Hafezi et al. |
| 2012/0310070 A1 | 12/2012 | Kumar et al. |
| 2012/0316413 A1 | 12/2012 | Liu et al. |
| 2013/0030259 A1 | 1/2013 | Thomsen et al. |
| 2013/0057385 A1 | 3/2013 | Murakami et al. |
| 2013/0060115 A1 | 3/2013 | Gehman et al. |
| 2013/0171596 A1 | 7/2013 | French |
| 2014/0280125 A1 | 9/2014 | Bhardwaj et al. |
| 2014/0300490 A1 | 10/2014 | Kotz et al. |
| 2014/0308930 A1 | 10/2014 | Tran |
| 2014/0349256 A1 | 11/2014 | Connor |
| 2014/0374276 A1 | 12/2014 | Guthrie et al. |
| 2015/0080677 A1 | 3/2015 | Thompson et al. |
| 2015/0080678 A1 | 3/2015 | Frank et al. |
| 2015/0080679 A1 | 3/2015 | Frank et al. |
| 2015/0080680 A1 | 3/2015 | Zdeblick et al. |
| 2015/0080681 A1 | 3/2015 | Hafezi et al. |
| 2015/0127737 A1 | 5/2015 | Thompson et al. |
| 2015/0127738 A1 | 5/2015 | Thompson et al. |
| 2015/0182170 A1 | 7/2015 | Zdeblick et al. |
| 2015/0248833 A1 | 9/2015 | Arne et al. |
| 2016/0226697 A1 | 8/2016 | Kushner et al. |

FOREIGN PATENT DOCUMENTS

| | | |
|---|---|---|
| CN | 101005470 | 7/2007 |
| CN | 101032396 | 9/2007 |
| CN | 201076456 | 6/2008 |
| DE | 10313005 | 10/2004 |
| EP | 1246356 | 10/2002 |
| EP | 1789128 | 5/2007 |
| EP | 2063535 | 5/2009 |
| EP | 2143369 | 1/2010 |
| JP | 61072712 | 4/1986 |
| JP | S62112529 | 5/1987 |
| JP | 05228128 | 9/1993 |
| JP | 1014898 | 1/1998 |
| JP | 2000506410 | 5/2000 |
| JP | 2002224053 | 8/2002 |
| JP | 2002282219 | 10/2002 |
| JP | 2002291684 | 10/2002 |
| JP | 2003050867 | 2/2003 |
| JP | 2004007187 | 1/2004 |
| JP | 2004313242 | 11/2004 |
| JP | 2005073886 | 3/2005 |
| JP | 2005102959 | 4/2005 |
| JP | 2005304880 | 4/2005 |
| JP | 2005137683 | 6/2005 |
| JP | 2005532841 | 11/2005 |
| JP | 2005532849 | 11/2005 |
| JP | 2006508752 | 3/2006 |
| JP | 2006509574 | 3/2006 |
| JP | 2006136405 | 6/2006 |
| JP | 2006177699 | 7/2006 |
| JP | 2007167448 | 7/2007 |
| JP | 2007313340 | 12/2007 |
| JP | 2008011865 | 1/2008 |
| JP | 2008501415 | 1/2008 |
| JP | 2008086390 | 4/2008 |
| JP | 2008191110 | 8/2008 |
| JP | 2009528909 | 8/2009 |
| KR | 927471 | 11/2009 |
| KR | 10-2012-09995 | 9/2012 |
| TW | 553735 | 9/2003 |
| TW | 200724094 | 7/2007 |
| WO | WO8802237 | 4/1988 |
| WO | WO9308734 | 5/1993 |
| WO | WO9319667 | 10/1993 |
| WO | WO9714112 | 4/1997 |
| WO | WO9843537 | 10/1998 |
| WO | WO9959465 | 11/1999 |
| WO | WO0033246 | 6/2000 |
| WO | WO0100085 | 1/2001 |
| WO | WO0147466 | 7/2001 |
| WO | WO0174011 | 10/2001 |
| WO | WO0180731 | 11/2001 |
| WO | WO0245489 | 6/2002 |
| WO | WO02058330 | 7/2002 |
| WO | WO02062276 | 8/2002 |
| WO | WO02087681 | 11/2002 |

(56) References Cited

FOREIGN PATENT DOCUMENTS

| | | |
|---|---|---|
| WO | WO03050643 | 6/2003 |
| WO | WO2004014225 | 2/2004 |
| WO | WO2004039256 | 5/2004 |
| WO | WO2004059551 | 7/2004 |
| WO | WO2004066834 | 8/2004 |
| WO | WO2004068748 | 8/2004 |
| WO | WO2004068881 | 8/2004 |
| WO | WO2004075751 | 9/2004 |
| WO | WO2004109316 | 12/2004 |
| WO | WO2005011237 | 2/2005 |
| WO | WO2005013503 | 2/2005 |
| WO | WO2005020023 | 3/2005 |
| WO | WO2005024687 | 3/2005 |
| WO | WO2005041767 | 5/2005 |
| WO | WO2005047837 | 5/2005 |
| WO | WO2005051166 | 6/2005 |
| WO | WO2005055448 | 6/2005 |
| WO | WO2005082436 | 9/2005 |
| WO | WO2005110238 | 11/2005 |
| WO | WO2006027586 | 3/2006 |
| WO | WO2006035351 | 4/2006 |
| WO | WO2006046648 | 5/2006 |
| WO | WO2006055892 | 5/2006 |
| WO | WO2006055956 | 5/2006 |
| WO | WO2006066566 | 6/2006 |
| WO | WO2006075016 | 7/2006 |
| WO | WO2006100620 | 9/2006 |
| WO | WO2006104843 | 10/2006 |
| WO | WO2006109072 | 10/2006 |
| WO | WO2006116718 | 11/2006 |
| WO | WO2006119345 | 11/2006 |
| WO | WO2006127355 | 11/2006 |
| WO | WO2007001724 | 1/2007 |
| WO | WO2007001742 | 1/2007 |
| WO | WO2007013952 | 2/2007 |
| WO | WO2007014084 | 2/2007 |
| WO | WO2007014527 | 2/2007 |
| WO | WO2007021496 | 2/2007 |
| WO | WO2007027660 | 3/2007 |
| WO | WO2007028035 | 3/2007 |
| WO | WO2007036687 | 4/2007 |
| WO | WO2007036741 | 4/2007 |
| WO | WO2007036746 | 4/2007 |
| WO | WO2007040878 | 4/2007 |
| WO | WO2007071180 | 6/2007 |
| WO | WO2007096810 | 8/2007 |
| WO | WO2007101141 | 9/2007 |
| WO | WO2007120946 | 10/2007 |
| WO | WO2007127316 | 11/2007 |
| WO | WO2007127455 | 11/2007 |
| WO | WO2007127879 | 11/2007 |
| WO | WO2007128165 | 11/2007 |
| WO | WO2007130491 | 11/2007 |
| WO | WO2007143535 | 12/2007 |
| WO | WO2007149546 | 12/2007 |
| WO | WO2008002239 | 1/2008 |
| WO | WO2008008281 | 1/2008 |
| WO | WO2008030482 | 3/2008 |
| WO | WO2008052136 | 5/2008 |
| WO | WO2008063626 | 5/2008 |
| WO | WO2008066617 | 6/2008 |
| WO | WO2008076464 | 6/2008 |
| WO | WO2008089232 | 7/2008 |
| WO | WO2008091683 | 7/2008 |
| WO | WO2008095183 | 8/2008 |
| WO | WO2008097652 | 8/2008 |
| WO | WO2008101107 | 8/2008 |
| WO | WO2008112577 | 9/2008 |
| WO | WO2008112578 | 9/2008 |
| WO | WO2008120156 | 10/2008 |
| WO | WO2008133394 | 11/2008 |
| WO | WO2008134185 | 11/2008 |
| WO | WO2008150633 | 12/2008 |
| WO | WO2009001108 | 12/2008 |
| WO | WO2009006615 | 1/2009 |
| WO | WO2009029453 | 3/2009 |
| WO | WO2009031149 | 3/2009 |
| WO | WO2009036334 | 3/2009 |
| WO | WO2009051829 | 4/2009 |
| WO | WO2009051830 | 4/2009 |
| WO | WO2009063377 | 5/2009 |
| WO | WO2009081348 | 7/2009 |
| WO | WO2009111664 | 9/2009 |
| WO | WO2009146082 | 12/2009 |
| WO | WO2010003175 | 1/2010 |
| WO | WO2010009100 | 1/2010 |
| WO | WO2010011833 | 1/2010 |
| WO | WO2010019778 | 2/2010 |
| WO | WO2010057049 | 5/2010 |
| WO | WO2010075115 | 7/2010 |
| WO | WO2010080843 | 7/2010 |
| WO | WO2010105053 | 9/2010 |
| WO | WO2010107563 | 9/2010 |
| WO | WO2010115194 | 10/2010 |
| WO | WO2010132331 | 11/2010 |
| WO | WO2010135516 | 11/2010 |
| WO | WO2012104657 | 8/2012 |
| WO | WO2012112561 | 8/2012 |
| WO | WO2012158190 | 11/2012 |
| WO | WO2013012869 | 1/2013 |
| WO | WO2015042411 | 3/2015 |
| WO | WO2015044722 | 4/2015 |
| WO | WO2015112603 | 7/2015 |

OTHER PUBLICATIONS

Arshak et al., A Review and Adaptation of Methods of Object Tracking to Telemetry Capsules IC-Med (2007) vol. 1, No. 1, Issue 1, 12 pp.

"ASGE Technology Status Evaluation Report: wireless capsule endoscopy" American Soc. For Gastrointestinal Endoscopy (2006) vol. 63, No. 4; 7 pp.

Au-Yeung, K., et al., "A Networked System for Self-Management of Drug Therapy and Wellness", Wireless Health '10, Oct. 5-7, 2010, San Diego, 9 pages.

Aydin et al., "Design and implementation considerations for an advanced wireless interface in miniaturized integrated sensor Microsystems" Sch. of Eng. & Electron., Edinburgh Univ., UK; (2003); abstract.

Barrie, Heidelberg pH capsule gastric analysis. Texbook of Natural Medicine, (1992), Pizzorno, Murray & Barrie.

Baskiyar, S. "A Real-time Fault Tolerant Intra-body Network" Dept. of Comp. Sci & Soft Eng; Auburn University; Proceedings of the 27th Annual IEEE Conference; 0742-1303/02 (2002) IEEE; 6 pp.

Brock, "Smart Medicine: The Application of Auto-ID Technology to Healthcare" Auto-ID Labs (2002) http://www.autoidlabs.org/uploads/media/MIT-AUTOID-WH-010.pdf.

Carlson et al., "Evaluation of a non-invasive respiratory monitoring system for sleeping subjects" Physiological Measurement (1999) 20(1): 53.

Delvaux et al., "Capsule endoscopy: Technique and indications" Clinical Gastoenterology (2008) vol. 22, Issue 5, pp. 813-837.

Description of ePatch Technology Platform for ECG and EMG, located it http://www.madebydelta.com/imported/images/DELTA_Web/documents/ME/ePatch_ECG_EMG.pdf, Dated Sep. 2, 2010.

Evanczuk, S., "PIC MCU software library uses human body for secure communications link" EDN Network; edn.com; (Feb. 26, 2013) Retrieved from internet Jun. 19, 2013 at http://www.edn.com/electronics-products/other/4407842/PIC-MCU-software-library-uses-human-body-for-secure-communications-link; 5 pp.

Fawaz et al., "Enhanced Telemetry System using CP-QPSK Band—Pass Modulation Technique Suitable for Smart Pill Medical Application" IFIP IEEE Dubai Conference (2008); http://www.asic.fh-offenburg.de/downloads/ePille/IFIP_IEEE_Dubai_Conference.pdf.

Gilson, D.R. "Molecular dynamics simulation of dipole interactions", Department of Physics, Hull University, (Dec. 2002), p. 1-43.

(56) References Cited

OTHER PUBLICATIONS

Given Imaging, "Agile Patency Brochure" (2006) http://www.inclino.no/documents/AgilePatencyBrochure_Global_GMB-0118-01.pdf; 4pp.
Gonzalez-Guillaumin et al., "Ingestible capsule for impedance and pH monitoring in the esophagus" IEEE Trans Biomed Eng. (2007) 54(12: 2231-6; abstract.
Greene, "Edible RFID microchip monitor can tell if you take your medicine" Bloomberg Businessweek (2010) 2 pp.; http://www.businessweek.com/idg/2010-03-31/edible-rfid-microchip-monitor-can-tell-if-you-take-your-medicine.html.
Halthion Medical Technologies "Providing Ambulatory Medical Devices Which Monitor, Measure and Record" webpage. Online website: http://www.halthion.com/; downloaded (May 30, 2012).
Heydari et al., "Analysis of the PLL jitter due to power/ground and substrate noise"; IEEE Transactions on Circuits and Systems (2004) 51(12): 2404-16.
Hoover et al., "Rx for health: Engineers design pill that signals it has been swallowed" University of Florida News (2010) 2pp.; http://news.ufl.edu/2010/03/31/antenna-pill-2/.
Hotz "The Really Smart Phone" The Wall Street Journal, What They Know (2011); 6 pp.; http://online.wsj.com/article/SB10001424052748704547604576263261679848814.html?mod=djemTECH_t.
Intromedic, MicroCam Innovative Capsule Endoscope Pamphlet. (2006) 8 pp (http://www.intromedic.com/en/product/productinfo.asp).
ISFET—Ion Sensitive Field-Effect Transistor; Microsens S.A. pdf document. First in Office Action dated (Jun. 13, 2011) for U.S. Appl. No. 12/238,345; 4pp.
Jung, S. "Dissolvable 'Transient Electronics' Will Be Good for Your Body and the Environment" MedGadget; (Oct. 1, 2012); Onlne website: http://medgadget.com/2012/10/dissolvable-transient-electronics-will-be-good-for-your-body-and-the-environment.html; downloaded Oct. 24, 2012; 4 pp.
Juvenile Diabetes Research Foundation International (JDRF), "Artificial Pancreas Project" (2010); http://www.artificialpancreasproject.com/; 3 pp.
Li, P-Y, et al. "An electrochemical intraocular drug delivery device", Sensors and Actuators A 143 (2008) p. 41-48.
Lifescan, "OneTouch UltraLink™" http://www.lifescan.com/products/meters/ultralink (2010) 2 pp.
MacKay et al., "Radio Telemetering from within the Body" Inside Information is Revealed by Tiny Transmitters that can be Swallowed or Implanted in Man or Animal Science (1991) 1196-1202; 134; American Association for the Advancement of Science, Washington D.C.
MacKay et al., "Endoradiosonde" Nature, (1957) 1239-1240, 179 Nature Publishing Group.
McKenzie et al., "Validation of a new telemetric core temperature monitor" J. Therm. Biol. (2004) 29(7-8):605-11.
Medtronic, "CareLink Therapy Management Software for Diabetes" (2010); https://carelink.minimed.com/patient/entry.jsp?bhcp=1; 1 pp.
Medtronic, "Carelink™ USB" (2008) http://www.medtronicdiabetes.com/pdf/carelink_usb_factsheet.pdf 2pp.
Medtronic "The New MiniMed Paradigm® REAL-Time Revel™ System" (2010) http://www.medtronicdiabetes.com/products/index.html; 2 pp.
Medtronic, "Mini Med Paradigm® Revel™ Insulin Pump" (2010) http://www.medtronicdiabetes.com/products/insulinpumps/index.html; 2 pp.
Medtronic, Mini Med Paradigm™ Veo™ System: Factsheet (2010). http://www.medtronic-diabetes.com.au/downloads/Paradigm%20Veo%20Factsheet.pdf ; 4 pp.
Melanson, "Walkers swallow RFID pills for science" Engadget (2008); http://www.engadget.com/2008/07/29/walkers-swallow-rfid-pills-for-science/.
MiniMitter Co. Inc. "Actiheart" Traditional 510(k) Summary. (Sep. 27, 2005).
MiniMitter Co. Inc. Noninvasive technology to help your studies succeed. Mini Mitter.com (Mar. 31, 2009).
Mini Mitter Co, Inc. 510(k) Premarket Notification Mini-Logger for Diagnostic Spirometer. (Sep. 21, 1999).
Mini Mitter Co, Inc. 510(k) Premarket Notification for VitalSense. (Apr. 22, 2004).
MiniMitter Co. Inc. VitalSense Integrated Physiological Monitoring System. Product Description. (2005).
MiniMitter Co. Inc. VitalSense Wireless Vital Signs Monitoring. Temperatures.com (Mar. 31, 2009).
Mojaverian et al., "Estimation of gastric residence time of the Heidelberg capsule in humans: effect of varying food composition" Gastroenterology (1985) 89:(2): 392-7.
"New 'smart pill' to track adherence" E-Health-Insider (2010) http://www.e-health-insider.com/news/5910/new_'smart_pill'_monitors_medicines.
Owano, N., "Study proposes smart sutures with sensors for wounds" phys.org. (Aug. 2012). http://phys.org/news/2012-08-smart-sutures-sensors-wounds.html.
Park, "Medtronic to Buy MiniMed for $3.7 Billion" (2001) HomeCare; http://homecaremag.com/mag/medical_medtronic_buy_minimed/; 2 pp.
Radio Antennae, http://www.erikdeman.de/html/sail018h.htm; (2008) 5 pages.
"RFID "pill" monitors marchers" RFID News (2008) http://www.rfidnews.org/2008/07/23/rfid-pill-monitors-marchers/.
Sanduleanu et al., "Octave tunable, highly linear, RC-ring oscillator with differential fine-coarse tuning, quadrature outputs and amplitude control for fiber optic transceivers" (2002) IEEE MTT-S International Microwave Symposium Digest 545-8.
Santini, J.T. et al, "Microchips as controlled drug delivery-devices", Agnew. Chem. Int. Ed. (2000), vol. 39, p. 2396-2407.
"SensiVida minimally invasive clinical systems" Investor Presentation (Oct. 2009) 28pp; http://www.sensividamedtech.com/SensiVidaGeneralOctober09.pdf.
Shawgo, R.S. et al. "BioMEMS from drug delivery", Current Opinion in Solid State and Material Science 6 (2002), p. 329-334.
Shrivas et al., "A New Platform for Bioelectronics-Electronic Pill", Cummins College, (2010).; http://www.cumminscollege.org/downloads/electronics_and_telecommunication/Newsletters/Current%20Newsletters.pdf; First in third party client search conducted by Patent Eagle Search May 18, 2010 (2010).
"Smartlife awarded patent for knitted transducer" Innovation in Textiles News: http://www.innovationintextiles.com/articles/208.php; 2pp. (2009).
"The SmartPill Wireless Motility Capsule" Smartpill, The Measure of GI Health; (2010) http://www.smartpillcorp.com/index.cfm?pagepath=Products/The_SmartPill_Capsule&id=17814.
Solanas et al., "RFID Technology for the Health Care Sector" Recent Patents on Electrical Engineering (2008) 1, 22-31.
Soper, S.A. et al. "Bio-Mems Technologies and Applications", Chapter 12, "MEMS for Drug Delivery", p. 325-346 (2007).
Swedberg, "University Team Sees Ingestible RFID Tag as a Boon to Clinical Trials" RFID Journal (Apr. 27, 2010); http://www.rfidjournal.com/article/view/7560/1.
Tajalli et al., "Improving the power-delay performance in subthreshold source-coupled logic circuits" Integrated Circuit and System Design. Power and Timing Modeling, Optimization and Simulation, Springer Berlin Heidelberg (2008) 21-30.
Tatbul et al., "Confidence-based data management for personal area sensor networks" ACM International Conference Proceeding Series (2004) 72.
Tierney, M.J. et al "Electroreleasing Composite Membranes for Delivery of Insulin and other Biomacromolecules", J. Electrochem. Soc., vol. 137, No. 6, (Jun. 1990), p. 2005-2006.
Walkey, "MOSFET Structure and Processing"; 97.398 Physical Electronics Lecture 20.
Xiaoming et al., "A telemedicine system for wireless home healthcare based on bluetooth and the internet" Telemedicine Journal and e-health (2004) 10(S2): S110-6.
Yang et al., "Fast-switching frequency synthesizer with a discriminator-aided phase detector" IEEE Journal of Solid-State Circuits (2000) 35(10): 1445-52.

(56) References Cited

OTHER PUBLICATIONS

Yao et al., "Low Power Digital Communication in Implantable Devices Using Volume Conduction of Biological Tissues" Proceedings of the 28th IEEE, EMBS Annual International Conference, (Aug. 30-Sep. 3, 2006).
Zimmerman, "Personal Area Networks: Near-field intrabody communication" IBM Systems Journal (1996) 35 (3-4):609-17.
Zworkin, "A Radio Pill" Nature, (1957) 898, 179 Nature Publishing Group.
Bergogne C., et al., "A new frequency estimator applied to burst transmission", IEEE International Conference on Acoustics, Speech and Signal Processing, Apr. 21, 1997, vol. 1, pp. 267-270.

* cited by examiner

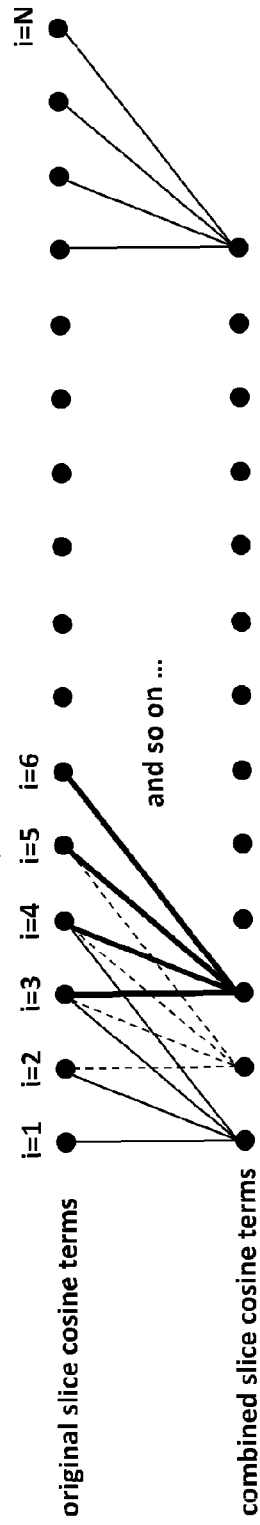
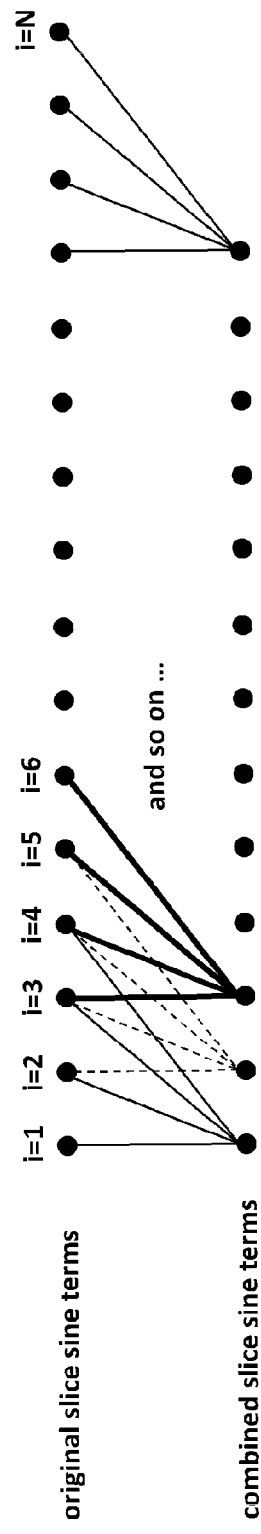
FIG. 4

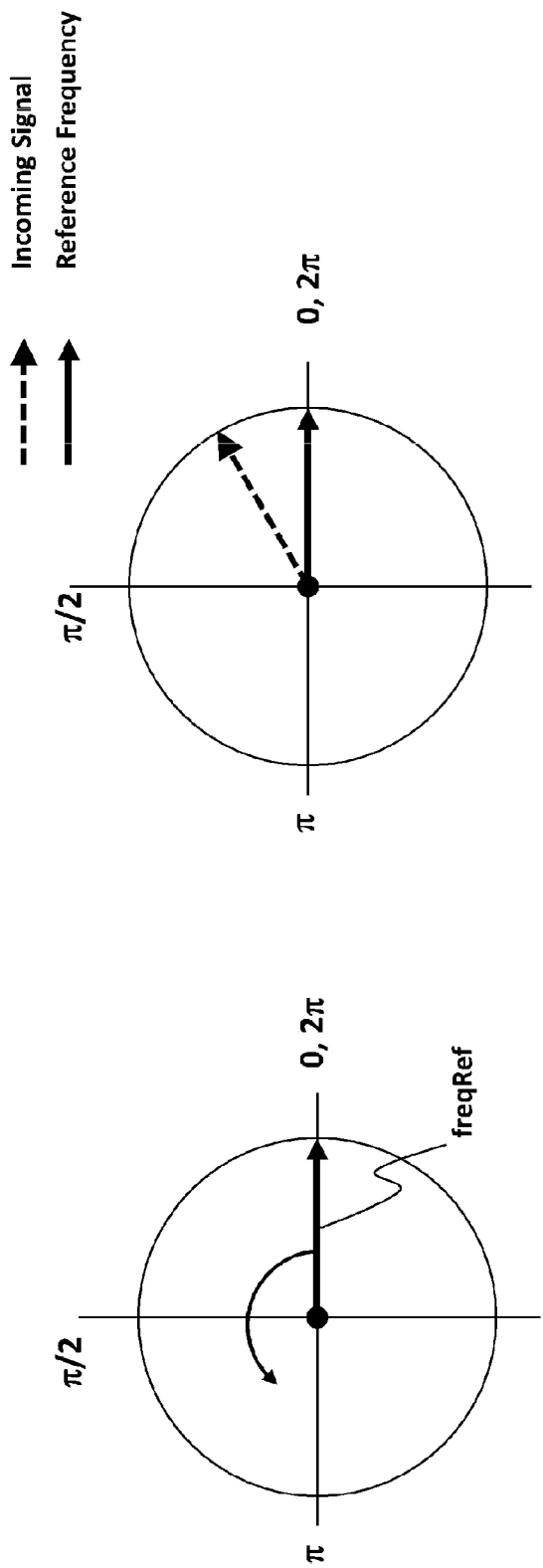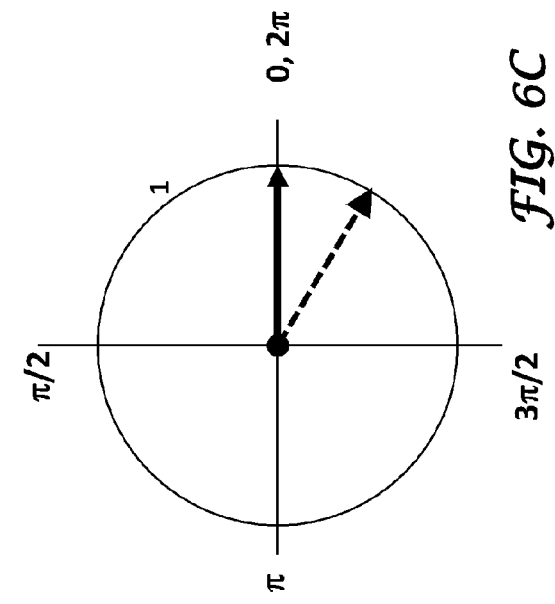
FIG. 6A   FIG. 6B   FIG. 6C

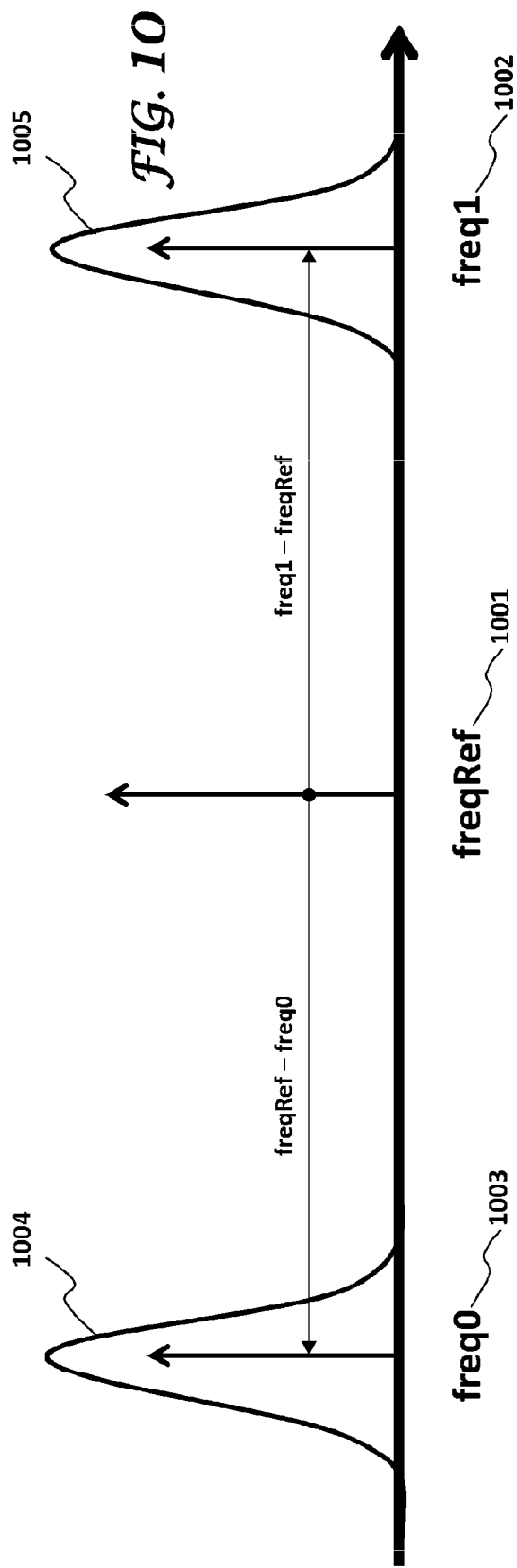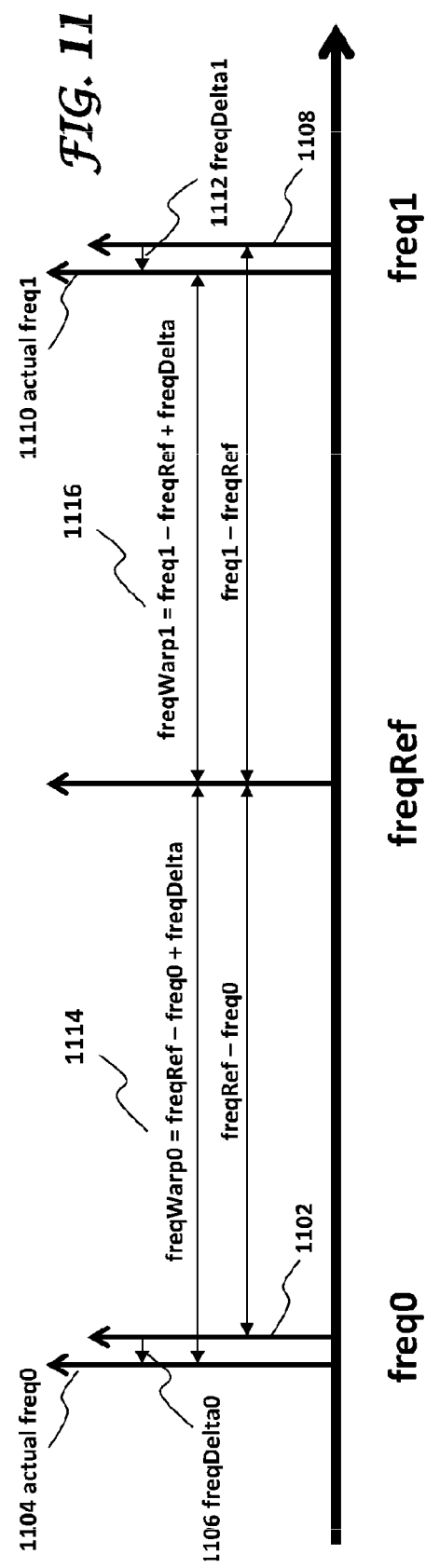

METHODS, DEVICES AND SYSTEMS FOR RECEIVING AND DECODING A SIGNAL IN THE PRESENCE OF NOISE USING SLICES AND WARPING

CROSS-REFERENCE TO RELATED APPLICATIONS

This application is a continuation application claiming priority under 35 U.S.C. §120 to U.S. patent application Ser. No. 14/491,447, titled METHODS, DEVICES AND SYSTEMS FOR RECEIVING AND DECODING A SIGNAL IN THE PRESENCE OF NOISE USING SLICES AND WARPING, filed on Sep. 19, 2014, now U.S. Pat. No. 9,270,503 which application claims the benefit under 35 USC §119(e) of U.S. Provisional Application No. 61/880,786 titled METHODS, DEVICES AND SYSTEMS FOR RECEIVING AND DECODING A SIGNAL IN THE PRESENCE OF NOISE USING SLICES AND WARPING, filed Sep. 20, 2013, the disclosures of which are herein incorporated by reference.

INTRODUCTION

Ingestible sensors may comprise a low power communicator whose transmissions are received by a receiver that may be worn outside of the body. Conventional 'body communication systems' should be capable of processing high-speed raw data in a predetermined amount of time, with considerations to available power consumption and memory size. In a conventional receiver, the incoming signal passes through an 'analog front-end' circuit comprising analog filters and analog electronic amplifiers. The analog filter typically has a wide bandwidth, to allow for the detection of all possible transmitted frequencies, as determined by the manufacturing tolerance of the transmitter carrier frequency. The filtering provided in the analog front-end is modest, and allows a significant amount of noise to get through along with the desired signal. After analog amplification and filtering, the signal is digitized by an analog-to-digital converter (ADC). The remainder of the processing of the received signal may be carried out in digital hardware, such as an embedded microprocessor, state machine, logic gate array, among others. The now-digitized signal may pass through one or more narrow-band digital filters to remove as much noise as possible before decoding is attempted.

In cases in which the receiver's estimate of the carrier frequency has a significant amount of uncertainty, the receiver is required to start with a wider-bandwidth digital filter and to, therefore, admit a greater amount of noise. The greater amount of noise means that a weak signal may be missed entirely. To reject the most noise, however, the receiver may apply a digital filter with a narrow bandwidth. But, if the narrow filter is centered on the incorrect carrier frequency, the incoming signal may be missed entirely. For efficient detection and decoding of the incoming signal, therefore, a balance must be achieved between narrow-bandwidth filters to remove as much noise as possible and filters having a greater bandwidth to increase the likelihood that the signal's carrier frequency will be captured when the receiver's knowledge of the incoming carrier frequency is imprecise. The receiver, therefore, may be configured to iteratively adjust the center frequency of the narrow filter, move it to a new center and to thereafter again attempt detection. This process of searching for the carrier with a narrow bandwidth filter is both time consuming and power intensive. Significantly, to re-filter at the new center frequency, the receiver either must retain a copy of the original data record in memory, or, if the original data is not available, capture an entirely new data record. This process not only requires significant memory resources (especially using high resolution ADCs) but also expends a significant amount of device battery life merely to identify the carrier frequency of the incoming signal.

SUMMARY

The present invention in a further aspect provides a program. Such a program can be provided by itself or carried by a carrier medium. The carrier medium may be a recording or other storage medium. The transmission medium may be a signal.

According to one embodiment, a method may comprise receiving and sampling a signal. The signal may encode a data packet. A slice may be generated and stored comprising a pair of values for each of a selected number of samples of the signal. The presence of the data packet may then be detected and the detected packet decoded from the stored slices. The samples of the signal may represent a correlation of the signal to reference functions in the receiver. The generating and storing slices may be carried out as the received signal is sampled. The sampled values of the signal may be discarded as the slices are generated and stored. The slice representation of the signal can be manipulated to generate filters with flexible bandwidth and center frequency.

According to one embodiment, a method of detecting and decoding a signal arriving at a receiver may begin with the receiver receiving an incoming signal, optionally carrying out some analog pre-processing (e.g. amplifying and filtering) at an analog front-end, after which the pre-processed data may be sampled in an ADC. The sampled raw data, according to one embodiment, then may be compared against internal reference templates stored in memory, using, for example, a correlation algorithm. One exemplary technique comprises correlating the sampled incoming signal with predetermined reference templates over a time period.

Embodiments address the problems inherent in capturing and storing a great many high-speed samples, which strains both computational capability and memory size. Embodiments solve both problems by capturing "slices". The slice data representation, according to one embodiment, contains sufficient information to efficiently and compactly represent the incoming signal and to implement filters of most any bandwidth. According to one embodiment, slices may be subject to a warping operation, by which sets of slices are transformed in useful ways to complete the detection process. Indeed, slices may be combined, according to one embodiment, to create filters having selectably wide or narrow pass-bands. According to embodiments, the warping operation may be configured to transform slices captured at one frequency to slices at another nearby frequency. This warping operation may be carried out by an algorithm configured to find an incoming carrier frequency and to find evidence of data packets in a noisy environment. The slice representation of signal data, coupled with the warping function, according to embodiments, represent a novel and highly efficient way to perform sophisticated detection algorithms with modest hardware and memory resources.

Further features of the present invention will become apparent from the following description of exemplary embodiments with reference to the attached drawings.

BRIEF DESCRIPTION OF THE DRAWINGS

FIG. 1 also shows a system comprising a transmitter and a receiver configured according to one embodiment.

FIG. 4 shows aspects of a method of combining sine and cosine slice terms to form a longer correlation, according to one embodiment.

FIG. 6A shows a rotating vector at a reference frequency in a polar coordinate system.

FIG. 6B shows a rotating vector at a reference frequency and a rotating vector of a signal at a frequency that is greater than the reference frequency, in a polar coordinate system.

FIG. 6C shows a rotating vector at a reference frequency and a rotating vector of a signal at a frequency that is lower than the reference frequency, in a polar coordinate system.

FIG. 10 shows aspects of Frequency Shift Keying (FSK) carrier detection, according to one embodiment.

FIG. 11 shows aspects of fine tuning FSK carrier detection, according to one embodiment.

DETAILED DESCRIPTION

Figure 1:
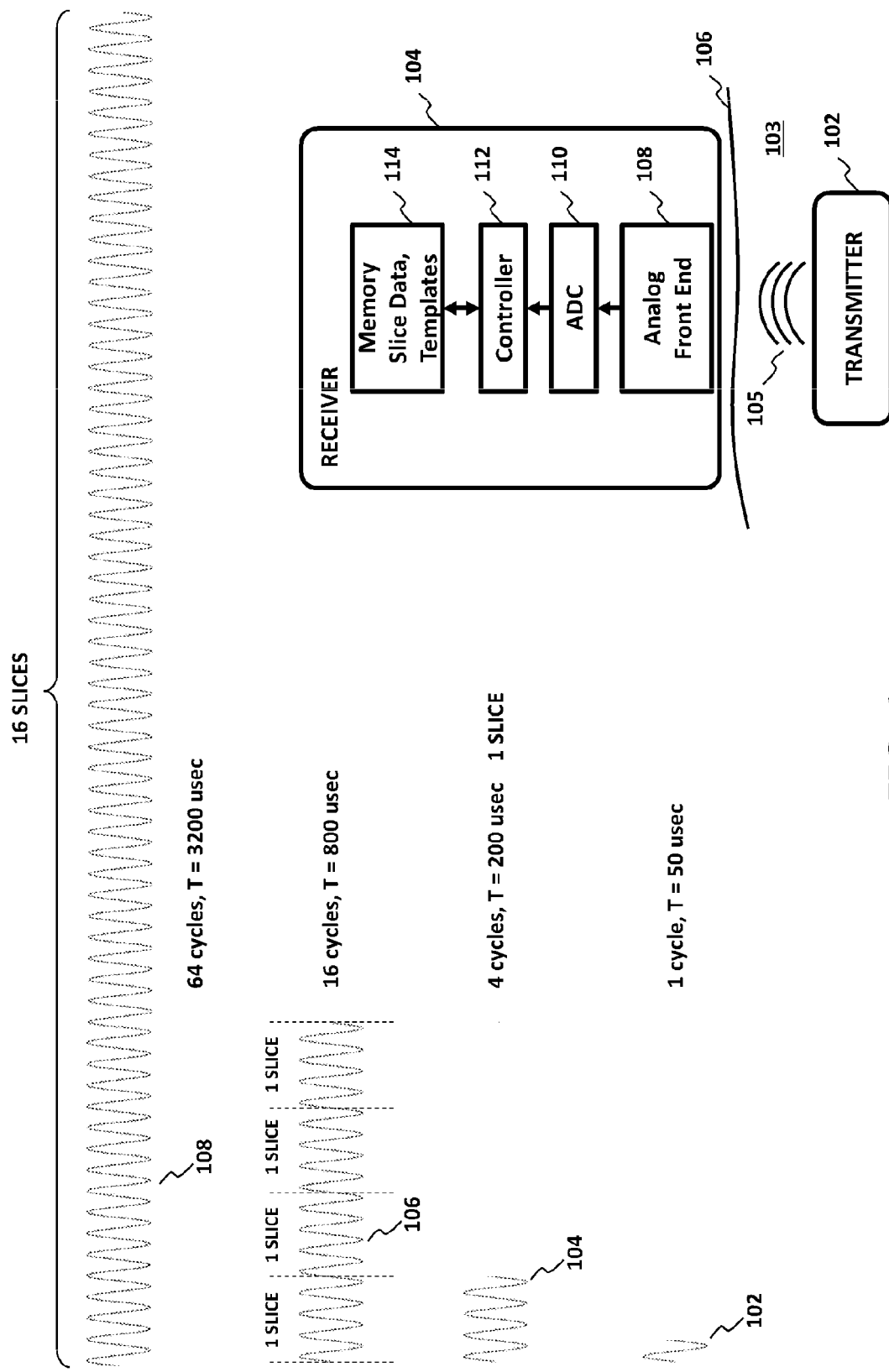
FIG. 1 shows various waveforms and an example slice, according to one embodiment.

FIG. 1 shows a system comprising a low-power oscillating transmitter 102 and a receiver 104, according to one embodiment. As shown therein, the oscillating transmitter 102 may be separated from the receiver 104 by a communication channel 103. For example, the oscillating transmitter 102 may be disposed within an ingestible sensor whose transmissions 105 are received by a receiver patch comprising the receiver 104 that may be worn outside of the body, such as on the skin 106. In this case, the communication channel 103 may comprise the aqueous environment of the body. The receiver 104 may comprise an analog front-end in which the received signal may be pre-processed, before being input to an ADC 110, which may generate a time-series of raw digital samples. The samples may be represented as binary numbers, from 1 to 24 bits in size, for example. The receiver 104 also may comprise a controller 112, which may be coupled to a memory 114. The memory 114 may be configured to store, as detailed below, slice data, reference templates and other temporary values as needed by controller 112. The receiver may also comprise a communication interface (not shown), to enable decoded payload of packets encoded in the received signal to be communicated to the outside world.

According to one embodiment, a computer-implemented method of detecting and decoding a signal arriving at a receiver 104 may begin with the receiver 104 receiving an incoming signal 105, carrying out some analog pre-processing (e.g. amplifying and filtering) at analog front-end 108, after which the pre-processed data may be sampled in ADC 110. The sampled raw data, according to one embodiment, then may be compared by the controller 112 against internal reference templates stored in memory 114, using a correlation algorithm. One technique comprises correlating the sampled incoming signal with predetermined reference templates over a time period.

Embodiments address the problems inherent in capturing and storing a great many high-speed samples, which strains both computational capability and memory size. Embodiments solve both problems by capturing "slices". The slice data representation, according to one embodiment, contains sufficient information to efficiently and compactly represent the incoming signal and to implement filters of most any bandwidth. According to one embodiment, slices may be subject to a warping operation, by which sets of slices are transformed in useful ways to complete the detection process. Indeed, slices may be combined, according to one embodiment, to create filters having selectably wide or narrow pass-bands. According to embodiments, the warping operation may be configured to transform slices captured at one frequency to slices at another nearby frequency. This warping operation may be carried out by an algorithm configured to find an incoming carrier frequency and to find evidence of data packets in a noisy environment. The slice representation of signal data, coupled with the warping function, according to embodiments, represent a novel and highly efficient way to perform sophisticated detection algorithms with modest hardware and memory resources. For example, one or more microcontrollers, one or more Field Programmable Gate Arrays (FPGAs) or Application Specific Integrated Circuits (ASICS) may be used to carry out the processing disclosed herein. A Digital Signal Processor (DSP) may also be used to good advantage.

SLICE: According to one embodiment, a slice construct is introduced. Short correlations, achieved through correlating a relatively short portion of the incoming signal (e.g. approximately 4-8 cycles), are denoted as slices herein. A slice interval, according to one embodiment, may be defined as a predetermined period of time. FIG. 1 shows various segments of a 20,000 Hz signal. As shown, reference 102 shows a single cycle of such a 20,000 Hz signal, whose period T is 1/20,000 Hz or 50 μsec. Reference 104 shows a single slice interval, defined as a time equal to 4 cycles of the 20,000 Hz signal, or 200 μsec. Herein, a slice interval is arbitrarily defined as 4 cycles of the incoming signal. A slice interval, however, may comprise a different amount of time or number of cycles. For example, a slice interval may comprise the time equal to 8 cycles. Below, unless specifically noted, a slice interval is defined as comprising 4 cycles of the incoming signal, it being understood that other slice intervals may readily be implemented. For example, the slice definition may be expressed in cycles, but is not required to be a multiple of full cycles of any signal or template. A slice may be any defined amount of time. The slice time may be changed in the receiver as needed. For example, the receiver could implement two slice routines to capture two slice streams simultaneously, one at 20 kHz and another at 12.5 kHz, for example. The two slice computations could use different slice times suitable for each channel. As shown at 106 in FIG. 1, four slice intervals may comprise 16 cycles and have a period of 800 μsec. Lastly, 64 cycles of the reference frequency may be divided into 16 slice intervals as shown at 108. The number of samples of the incoming signal included in one slice is governed by the definition of the slice interval and the sampling rate of the ADC:

samples per slice=ADC sample rate·slice interval.

The ADC sampling rate may be at least as often as the Nyquist theorem call for; namely, at least twice the frequency of interest. According to one embodiment, the ADC sample rate may be chosen to be higher, such as five or more times the frequency of interest of the incoming signal. Other sampling rates may be utilized. In one embodiment, the ADC in the receiver (adhered to a patient's abdomen, for example) may be configured to carry out forty or more samples per second. The starting times of consecutive slices may advantageously be selected to be periodic according to some fixed, for example, interval. However, acceptable results may also be obtained even when there are brief periods of time when no sampling is being carried out.

Figure 2A:
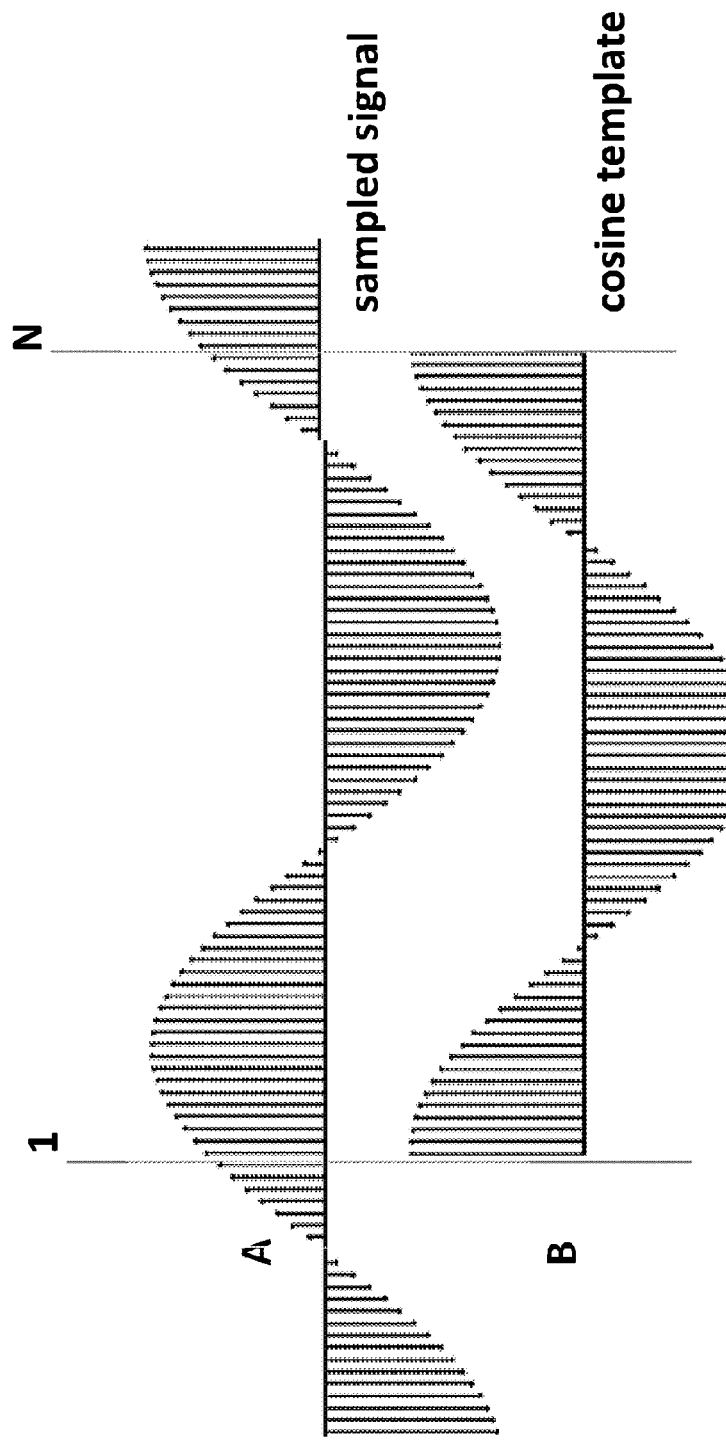
FIG. 2A illustrates correlation of two sampled waveforms.

To determine the similarity between digitized samples of an incoming signal and a reference template, a dot product (the sum of the products of corresponding samples) or correlation operation may be carried out. FIG. 2A shows such a correlation operation of a digitized incoming signal with a cosine template. Here, A may represent the digitized incoming signal and B may represent a template of a first reference function such as, for example, a cosine template at the reference frequency (e.g. 20,000 Hz). In other words, the cosine template B, according to one embodiment, is a representation of what the receiver 104 expects the cosine component of the received signal to look like and the correlation operation determines the degree of similarity between signal A and cosine template B. As shown, samples of signal A are multiplied with the corresponding samples of the cosine template B, and the results of these additions summed over the number of samples N. Stated more formally, C is the scalar product of A and B and may be expressed as:

$$C = A_1 \times B_1 + A_2 \times B_2 + A_3 \times B_3 + \ldots + A_N \times B_N$$

$$C = \sum_{n=1}^{N} A_n \times B_n$$

Figure 2B:
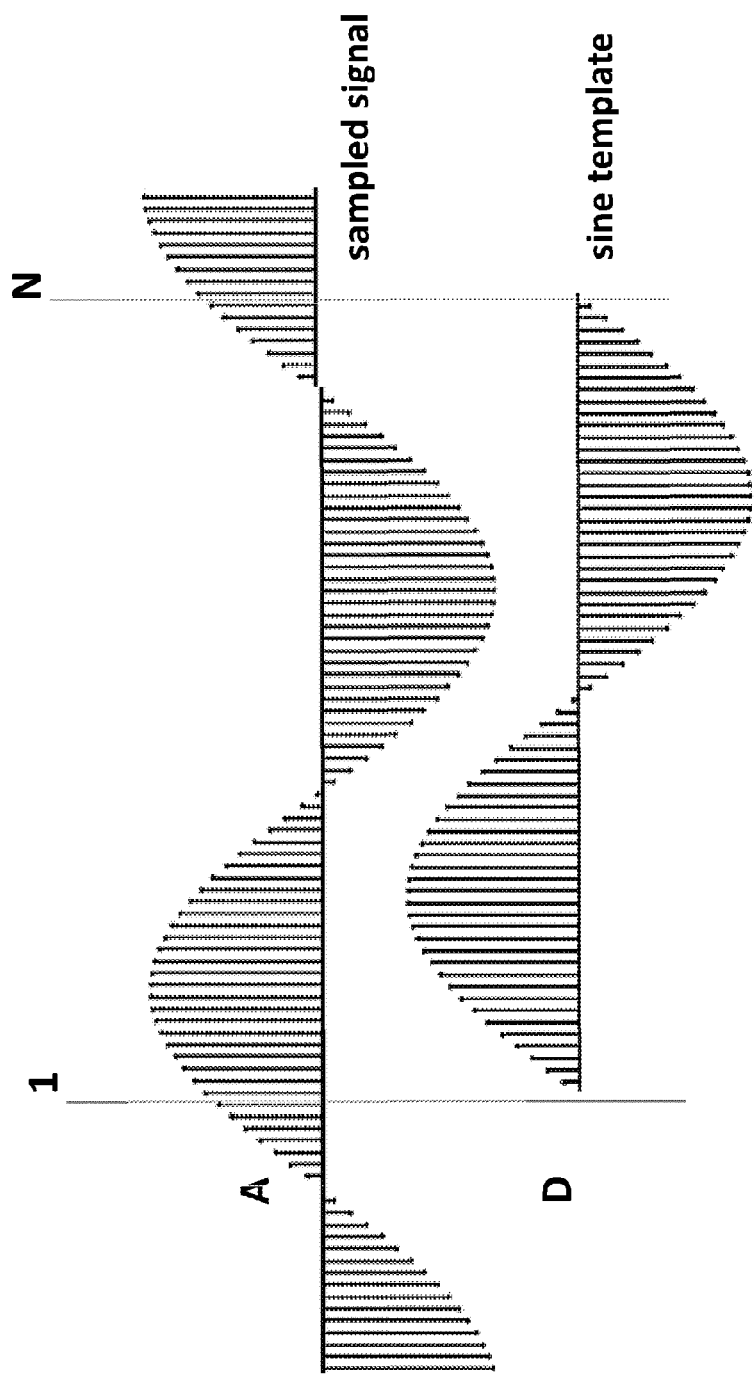
FIG. 2B illustrates shows the manner in which one term (the sine term, in this case) is calculated, according to one embodiment.

Similarly, FIG. 2B shows correlation with a sine template. Here, A may represent the digitized incoming signal and D may represent a template of a second reference function in quadrature with the first reference function. For example, the template of the second reference function may be, for example, a sine template at the reference frequency (e.g. 20,000 Hz). As shown, samples of signal A are multiplied with the corresponding samples of the sine template D, and the results of these additions summed over the number of samples N. Stated more formally, S is the scalar product of A and D and may be expressed as:

$$S = A_1 \times D_1 + A_2 \times D_2 + \ldots + A_N \times D_N$$

$$S = \sum_{n=1}^{N} A_n \times D_n$$

The orthogonal cosine and sine templates are in a quadrature phase relationship. The two correlation results, C and S, when taken together, represent a slice. In complex polar notation, C+j·S is a vector with an angle indicating the phase between the incoming signal and the receiver's reference templates. In practice, the slice may be thought of as a 1/(slice interval) filter.

According to one embodiment, the scalars C and S may be scaled by a scaling factor. For example, C and S may be scaled such that they may assume a range of values between, for example, 0 and 1. Other scaling factors and ranges may be accommodated.

As shown and discussed herein, the reference templates are sine templates and cosine templates. Other periodic shapes, however, may be used as the reference templates such as, for example, sawtooth, triangle or square signals. Selecting non-sinusoidal waveforms for the reference templates may result in some information being discarded, but the signal of interest may still be extracted from the received signal. Moreover, even though having the reference templates 90 degrees out of phase with one another (in quadrature), reference templates having other phase relationships with one another may be used. For example, the two reference templates could be 89 degrees or 91 degrees out of phase with one another, without substantial ill effect.

According to one embodiment, slice correlations (or, simply, slices) may be calculated from the raw digitized samples generated by the receiver's ADC 110. These raw digitized samples may be correlated against samples of both cosine and sine reference templates at the reference frequency (freqRef) stored in the receiver 104. The cosine term and sine term of a slice, according to one embodiment, may be defined as:

$$SliceCosTerm = \sum_{n=1}^{N} \text{signal}_n \times referenceCos_n$$

$$SliceSinTerm = \sum_{n=1}^{N} \text{signal}_n \times referenceSin_n$$

where N is the number of samples in one slice. The vector magnitude of a slice may be computed in Root Mean Square (RMS) fashion:

$$\text{Slice Magnitude} = \sqrt{SliceCosTerm^2 + SliceSinTerm^2}$$

The Slice Magnitude quantity is a scalar indicative of the magnitude of the combined slices. The vector angle of a slice thereof (Slice Angle), is given by $$\text{Slice Angle} = \arctan\left(\frac{SliceSinTerm}{SliceCosTerm}\right)$$

Figure 3:
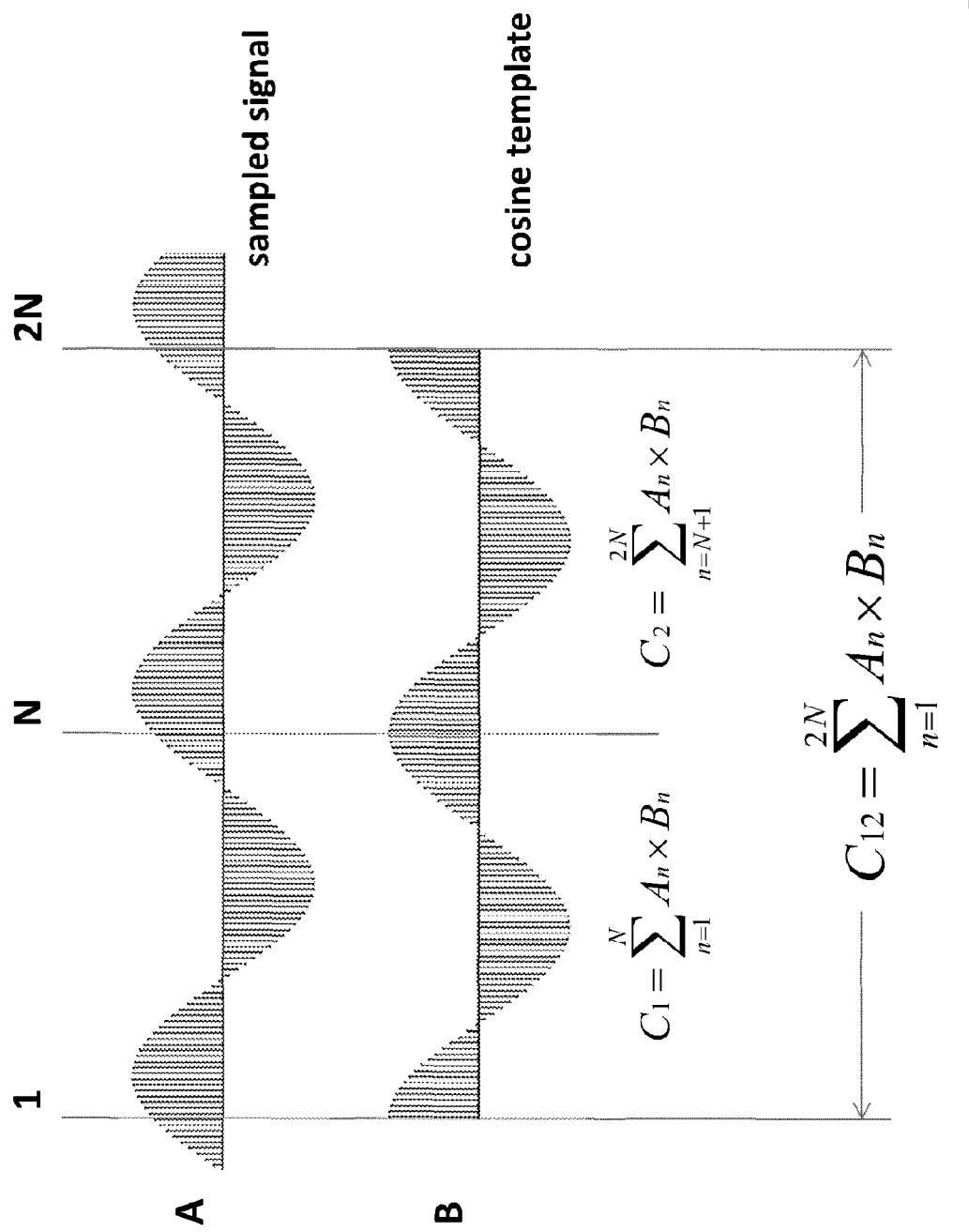
FIG. 3 illustrates aspects of a method of calculating a combined slice term (the cosine term, in this case), according to one embodiment.

COMBINING SLICES: FIG. 3 is a diagram showing the scalar dot product of signal A and template B over two slice intervals (where, in this figure, the slice interval encompasses one cycle of the cosine template), and shows the additive nature of the correlation. According to one embodiment, for slices to be combinable, each of the reference signals of each reference template should be coherent, meaning in phase with one another. As shown, the correlation or dot product of A and B over two slice intervals (2N samples, in this case) corresponds to the simple scalar sum (accumulation) of the correlation over the first N cycles with the correlation over the second N cycles of A and B. Or, $$C_1 = \sum_{n=1}^{N} A_n \times B_n$$

$$C_2 = \sum_{n=N+1}^{2N} A_n \times B_n$$

$$C_{12} = \sum_{n=1}^{2N} A_n \times B_n$$

$$C_{12} = C_1 + C_2$$

Moreover, to compute the correlation for a time interval corresponding to 3 slice intervals of A and B, it is not necessary to re-compute C1 and C2. Simply, compute the correlation C3, and add the result to C12 to generate the correlation (dot product of vectors A and B over a signal length of 3 slice intervals) C13. As a slice is equivalent to a 1/(slice interval) filter, as slices are combined into longer correlations, the filter bandwidth is correspondingly reduced, as further detailed below.

According to one embodiment, slices are treated as complex pairs, comprising both a cosine term and a sine term. The cosine term of a slice, according to one embodiment, represents the correlation between the sampled incoming signal and a cosine template stored in the receiver 104 at the reference frequency (freqRef). Similarly, the sine term of a slice, according to one embodiment, represents the correlation between the sampled incoming signal and a sine template stored in the receiver 104 at freqRef. FreqRef can be set to the expected or nominal frequency at which the transmitter is specified to transmit, but which may vary due to manufacturing variations (which may occur in both the transmitter and the receiver), ambient conditions such as the temperature of the transmitter and receiver, distortion through the communication channel (e.g. the aqueous and physiologic environments of the human body such as the salinity of the stomach and surrounding tissues Other factors may include, for example, variations in the frequency calibration process used on the transmitter and receiver, which may not be very accurate, or might have large frequency steps in their adjustment method.

According to embodiments, once the slice calculations have been carried out and the slice terms stored in memory 114, the original raw samples generated by the ADC (and from which the slices were generated) now may be discarded, as all subsequent packet detecting, frequency determination and payload decoding steps may be based on the stored slice data, without the need to ever consult or re-generate the digitized samples generated by the ADC. According to embodiments, the slice calculation and the storage of the slice data in memory 114 may be carried out 'on-the-fly' in real time by a suitable controller provided within the receiver 104. According to one embodiment, the slice correlation data may be calculated and stored in memory 114 by the receiver's controller 112 in the controller command execution cycles available between ADC sample times. Accordingly, there may be no need to store the raw digitized sample stream from the ADC 110 in memory 114, which represents a significant efficiency.

According to embodiments, significant reductions in the amount of data stored by the receiver 104 may be achieved. For example, the reference frequency of the carrier may be 20,000 Hz and the sample rate of the ADC may be 3.2 million samples per second (SPS), which corresponds to 160 ADC samples per cycle of the carrier. The sample rate of the ADC, however, may be freely chosen. For example, the sample rate of the ADC may be selected to be in the thousands of samples per second. For example, the sample rate of the ADC may be chosen to be about 200 kSPS, which corresponds to 10 ADC samples per cycle of the carrier. A controller 112 may be configured to execute, for example, 16 million instructions per second. If a slice interval were to be defined as 4 cycles of the reference frequency, at a sample rate of 200 kSPS, there are 10·4 or 40 ADC samples in each slice. There are 16,000,000/20,000 or 80 processor cycles available between each ADC sample, which is generally sufficient to generate and store the slice record. According to one embodiment, each individual new sample may be incorporated into the accumulating slice cosine and sine dot products and stored within these available processor cycles, thereby enabling the controller 112 to generate the slice data while keeping pace with the samples as they are generated by the ADC. The result of the slice correlation calculation is two numbers (a cosine term and a sine term), which represents a compression, per slice (e.g. 4 cycles of the incoming signal) of 40:2 or a compression factor of 20 relative to the raw sample stream. In this particular example, this represents over an order of magnitude reduction in memory requirements. Increasing the slice time or increasing the sampling rate linearly increases this compression rate. In one embodiment, a sampling rate of 760 kSPS allows for 21 processor cycles between samples, which is sufficient computational power to generate slice data while keeping pace with the samples as they arrive. Each cycle is represented by 760/20 or 38 samples, so each slice represents 4·38 or 152 samples of the incoming signal. The resulting compression factor is 152:2 or a compression factor of 71.

ANALOG SLICE PROCESSING—According to one embodiment, the incoming signal may be multiplied by two analog multipliers (e.g. quadrature mixers) with two reference signals. Each of the product signals may then be summed (e.g. by analog integration using a capacitor or an active circuit based on stored capacitor charge) for a period of time and then sampled at a much lower frequency. Each such sample pair represents a slice pair. Such an analog embodiment may enable power consumption advantages to be realized.

COMBINING SLICES, FILTERING—Effectively, the slice correlation calculation represents a filter with a bandwidth of 1/(slice interval) which, in the example case of a reference frequency of 20,000 Hz and 4 cycles per slice, works out to 1/200 µsec or 5,000 Hz, which is a filter having a relatively broad bandwidth. According to one embodiment, the constituent cosine components of the slice pair may be combined and the constituent sine components of the slice pair may be combined, thereby increasing the slice time and creating a filter having a narrower bandwidth. Due to the inverse relationship between slice interval and filter bandwidth, according to one embodiment, a narrower bandwidth filter may be achieved through combining slice terms. Indeed, slice correlations computed over short periods of time may be extended to longer correlations by combining such short periods of time; that is, by combining slices. Combining slice terms, according to one embodiment, may be carried out by summing a number of sequential cosine slice terms, summing the same number of sequential sine slice terms. The resulting two new terms, when paired together form a combined slice representing a longer correlation.

According to embodiments, such a slice combination calculation may be performed at every slice index (i.e., without skipping to every $N^{th}$ slice index). FIG. 4 is a graphical representation of combining previously-computed and stored slice pairs of cosine and sine components. As shown, the original cosine components of the stored slice data are labeled as "original slice cosine terms" and the original sine components of the slice data are labeled "original slice sine terms". To combine four slices, the first four cosine terms (i=1, 2, 3, 4) are summed into a "combined slice cosine term" with slice index 1. Likewise, the first four sine components of the slice data are summed into a "combined slice sine term", starting with the current index 1. Therefore, on the first iteration, i=1 and the previously computed cosine terms indexed at i=1, i=2, i=3 and i=4 are summed to form Slice Cos Term$_1$, and the previously computed sine terms indexed at i=1, i=2, i=3 and i=4 are combined to form Slice Sin Term$_1$, whereupon i is incremented to 2. Slice Cos Term$_2$ may then be formed by the four consecutive slice cosine terms, starting with the current i=2 slice index; namely, i=2, i=3, i=4 and i=5. Likewise, Slice Sin Term$_2$ may then be formed by a similar computation. This operation may be carried out for the entire slice record. By varying the number of slices over which the combining is carried out, the bandwidth of the resultant filter may be selected at will. This ability to rapidly and simply generate different filters is a generally useful capability in a receiver. By way of a simple example, when the receiver 104 is searching for the carrier frequency of the received signal, a small number of slice cosine and sine terms may be combined to generate what is, in effect, a filter having a relatively wide bandwidth, thereby increasing the probability that the carrier will be present somewhere within the frequency range encompassed by the wide bandwidth filter. However, such a wide bandwidth filter also admits a correspondingly large amount of noise, which may render detection of especially weak signals difficult. Alternatively, a larger number of slice terms may be combined to generate what is, in effect, a filter having a correspondingly narrow bandwidth. Such a narrow bandwidth filter, however, does not admit a large amount of noise, which may facilitate the detection of the carrier frequency.

According to embodiments, one result of combining slices is a digital filter having reduced bandwidth, while maintaining the time resolution of the original slices. It is to be noted that such filters may be constructed using only the slice data stored in memory 114, as the original raw ADC data may have already been discarded and may be, therefore unavailable. According to embodiments, slice combinations over a greater number of slices may be implemented. Moreover, slice combinations may be repeatedly performed over different numbers of slices (hence implementing filters of different bandwidths) using the original slice data or using previously combined slice records, without re-referencing the original raw ADC samples (which may have been previously discarded anyway) and without re-acquiring the incoming signal and re-generating new raw ADC samples. Because of the high level of compression represented by slice data (i.e., over an order of magnitude in the example being developed herewith), long recordings of slice data may be stored in, for example, controller memory, even in the face of strict memory size constraints. The memory 114 shown in FIG. 1 may be external to the controller 112 or internal thereto.

According to one embodiment, one need not combine slices if the original slice interval is defined to be as long a period of time as a combined slice would be, had the slices been combined. For example, the slice interval may be defined to be longer than 4 cycles, which is the exemplary implementation discussed herein. This may be desirable in systems in which there is good crystal control of the transmitter and the receiver. In such cases, warping (as discussed herein below) need be carried out over only a narrow frequency range to find the carrier frequency and/or to detect the presence of a packet in a noisy environment. Therefore, according to one embodiment, the originally-captured set of slices may be used to form a filter, without the need to combine slices as described herein.

As the slice combining calculations described and shown herein are largely composed of additions, such combining calculations may be carried out efficiently. Also, as the slice combining operation may operate only on the indexed slice cosine and sine terms stored in memory 114, the combining operation need not be carried out in real time, as the raw samples arrive, as it may be carried out after all slice pairs have been generated from the raw ADC samples of the incoming signal and stored in memory 114. Moreover, as the combining operations do not, according to one embodiment, alter the stored indexed slice pairs, the slice combining operations may be repeated any number of times, depending on the needs of the overall detection and decoding algorithms. That is, the original slice data may be reused many times at will. Alternatively, the slice combining operation may be performed on slices that themselves are the result of a combining operation. For example, a combination of four slices (a '4-slice' slice record) may be achieved either by 1) Combining four original slices to generate a 4-slice slice record, or 2) Combining two original slices into a 2-slice slice record, and then combine two slices from the 2-slice slice record to generate the desired 4-slice record. Such flexibility can be exploited to, for example, conserve memory in the processor.

SUMMARY: SLICE AND SLICE COMBINING—To review the slice representation up to this point in the discussion, an incoming signal can be captured by a sequence of short correlations against reference templates. The templates may comprise a first reference function and a second reference function. According to one embodiment, the first and second reference functions are in quadrature. For example, the first reference function may be or comprise a cosine function and the second reference function may be or comprise a sine function. The length of the correlation may be conveniently selected to be a few periods (or more) of the template functions. The result of a correlation is two scalar terms that can be thought of as representing a complex number: cos term+j·sin term. Each correlation result is herein referred to as a slice, and a number of slices are captured in memory in a slice record. One operation that may be applied to a slice record is slice combination as described above. Combining slices is performed with simple additions of the individual slice terms. Combining slices results in a new slice record representing a filter of narrower bandwidth than the original slice record. This capability is highly useful in receiving and filtering a signal embedded in noise.

To this point in the discussion, the center frequency of the combined-slice narrow-band filter is the frequency of the reference template functions. This choice of only a single center frequency is a significant limitation to the slice capture and slice combining operations described to this point. The following sections describe a method, according to one embodiment, to move the slice record to any nearby frequency, thereby significantly increasing the utility of the slice representation.

WARP—An important function in any signal processing device is the ability to respond to variations in the transmitted signal frequency. For systems capturing a signal in the slice representation described above, the same need applies. After capturing a signal in slice form using correlation to reference templates, it may be desirable to create filters at a frequency other than the reference frequency, (e.g. at a frequency freqRef plus a frequency delta (freqDelta). The frequency delta may be either a positive or negative offset from freqRef. According to one embodiment, such a new narrow-band filter centered at freqRef+freqDelta may be created by a) capturing slice records at a reference frequency (freqRef), b) transforming (also denoted as "warping" herein) the original slice record into a new warped slice record using a complex vector rotation operation in which the rotation angle is governed or determined by a so-called warping function (WF), and c) combining the warped slices to generate a narrow-band filter now centered at frequency freqRef+freqDelta.

One embodiment, therefore, enables slice data taken at one frequency (e.g. freqRef) to be warped to slice data at another frequency, say freqRef+freqDelta. This may be carried out, according to one embodiment, without acquiring new data and without the need to re-use the original samples generated from the ADC 110 at the analog front end of the receiver 104, as such original data stream may be discarded—or may simply never be stored. According to one embodiment, therefore, a warping method may be configured to shift the center frequency of a digital filter without re-acquiring new data and without re-using the original samples generated by the ADC 110 to which the (processed) incoming signal is input.

Figure 5:
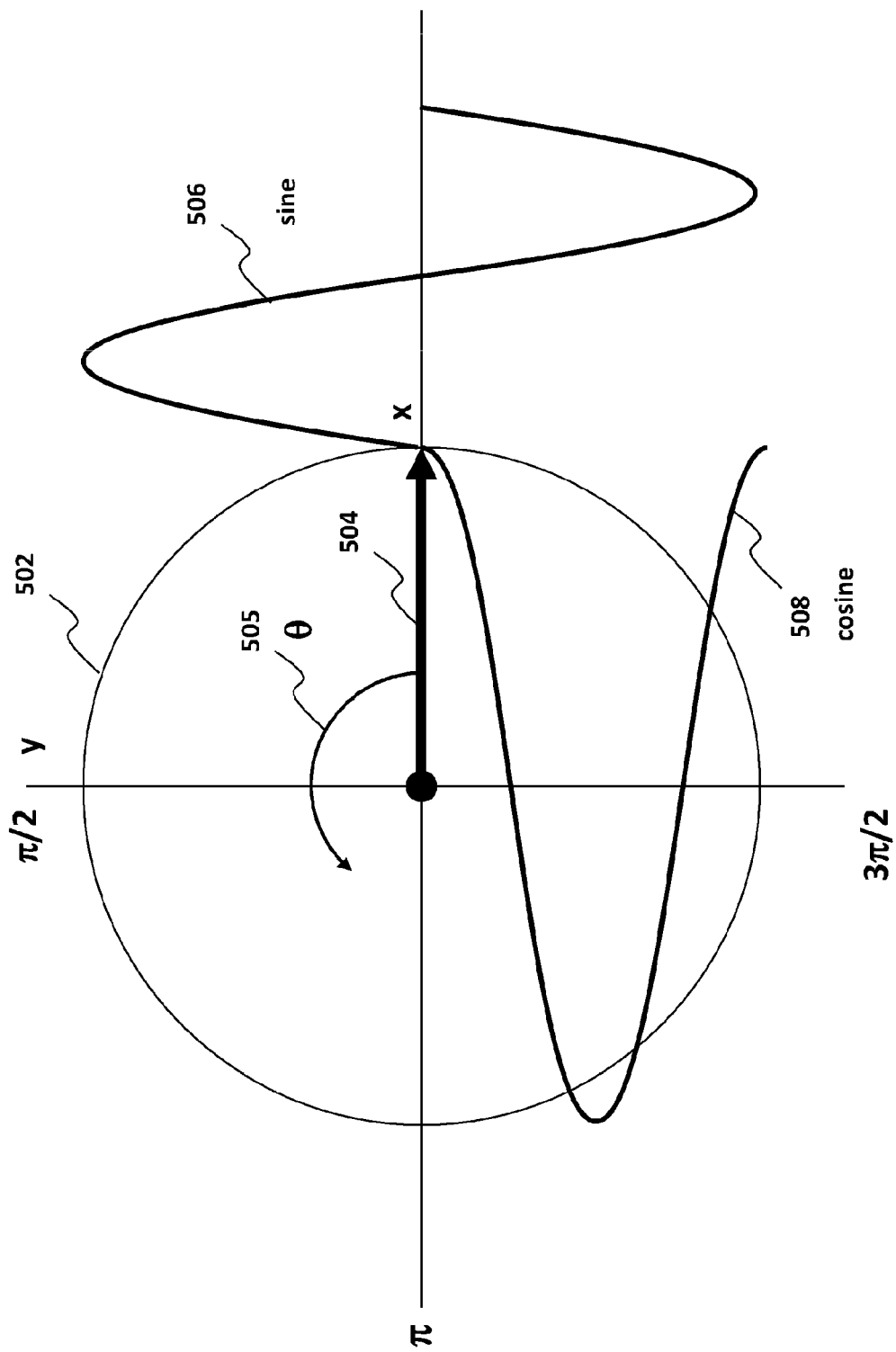
FIG. 5 shows the phase of a signal depicted as a rotating vector in a polar coordinate system.

POLAR NOTATION—FIG. 5 shows a vector 504 of length 1 in a polar coordinate system 502. As shown, any point in the polar coordinate system 502 may be represented as a complex pair, namely (x, y). Equivalently, any point in the polar coordinate system 502 can be represented by a magnitude 504 and angle, (r, θ) where θ (505) is the angle of the vector 504 relative to the positive x-axis. Points z in the complex plane may be defined as those points satisfying the equation z=r cos θ+j·r sin θ. The coordinates of any point comprises both a cosine term: r cos θ (508) and a sine term: r sin θ (506).

As shown in FIG. 6A, a reference frequency freqRef, such as the frequency of a reference template used in a correlation operation, may be represented as a rotating vector in a polar coordinate system. Ideally, the frequency of a signal received by a receiver would be exactly the same frequency that was transmitted, the reference frequency. Practically, however, such is not often the case. The frequency of the received incoming signal may be higher than that of the reference frequency freqRef. In that case, using the rotating vector representation of FIG. 5, the vector representing the incoming signal would lead (rotate faster than) the vector representing the reference frequency freqRef, as shown in FIG. 6B. Similarly, the frequency of the received incoming signal may be lower than that of the reference frequency freqRef. In that case, the vector representing the incoming signal would lag (rotate slower than) the vector representing the reference frequency freqRef, as shown in FIG. 6C.

Figure 7:
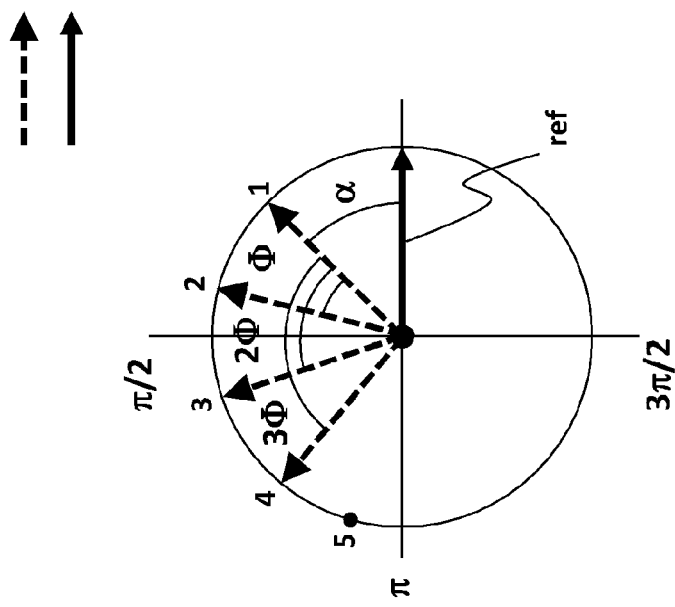
FIG. 7 shows aspects of warping, according to one embodiment.

In the example of FIG. 7, the incoming signal is shown as a higher frequency than the reference frequency. With reference to FIG. 7, a polar coordinate system is illustrated, with the x-axis corresponding to the cosine term and the y-axis corresponding to the sine term. A reference signal (freqRef, solid line) is shown, by convention, as a vector pointing along the positive x-axis (cosine axis). Slice data generated from an incoming signal are shown as dashed vectors representing slices 1, 2, 3, 4, etc. In this static representation, it can be seen that the vector representing the first slice establishes an arbitrary (0 to 2π radian) phase angle α with respect to the reference frequency vector. In this example, the subsequent slice vectors having slice indices 2, 3, 4, etc., lead (i.e., rotate faster than) the reference vector by an ever-increasing angle. The observation central to the warping concept is that the angle for each successive slice increases by a constant angle for all slices, Φ. That is, the second slice vector is at an angle Φ relative to the first slice vector, the third slice vector is at an angle of Φ relative the second slice vector, or equivalently 2Φ relative to the first slice vector, and the fourth slice is located at an angle Φ relative to the third slice, or equivalently 3Φ relative to the first slice vector. The angle Φ, and multiples thereof, therefore, may be thought of as the amount of lead or lag from slice to slice, and multiples thereof represent the amount of lead or lag with respect to the reference vector. FIG. 7 demonstrates that for an incoming signal frequency that does not perfectly match the reference frequency, the slice data becomes more and more out of phase (leads or lags) with the reference vector as the slice number increases. Even a very small initial angle Φ tends to grow such that the slices become significantly out of phase over time. The angle Φ is proportional to the ratio of freqDelta (the frequency difference between the incoming signal and the reference templates in the receiver) to the frequency of the reference templates, freqRef. The angle Φ is also proportional to the slice interval. According to one embodiment, the angle Φ in radians may be defined as $$\Phi = 2\pi\left(\frac{freqDelta}{freqRef}\right) \cdot \text{cycles per slice}$$

where freqDelta is the difference between the frequency of the incoming signal (freqSignal) and the frequency of the reference signal (freqRef).

freqDelta=freqSignal−freqRef

For a signal with a constant frequency, the angular shift between slices is consistent across slices. As graphically seen in FIG. 7, the amount of rotation for successive slices is not a constant angle with respect to the reference. Rather, the angle by which each successive slice is shifted, relative to the first slice is, in this illustrative example, an integer multiple of the angle Φ.

VECTOR ROTATION—The general form of a complex vector rotation by an angle θ can be represented in matrix form as:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

Where x and y are the original vector coordinates and θ is the rotation angle, with positive rotation in the counterclockwise direction. The resulting rotated vector coordinates are x' and y'. In algebraic form, the rotation operation can be expressed by two equations:

$$x' = x \cos\theta - y \sin\theta$$

$$y' = x \sin\theta + y \cos\theta$$

The operation may be represented informally as rotated vector=VectorRotate(input vector, angle)

In slice notation, cos term plays the role of the x value, and sin term plays the role of the y value.

WARP FUNCTION—A complex representation allows slices to be displayed as vectors on a complex polar plane. Complex vector notation is a convenient way to illustrate warping operations in the following description of the so-called warp function (WF). Slices may be represented as complex pairs; namely, cos term+j·sin term. According to one embodiment, the manner in which slice data are operated upon may be characterized as vector rotation where the rotation angle is determined by a Warp Function (WF). Warping of a slice record may be the result of a complex vector rotation operation (say, VectorRotate), which takes two arguments: the input slice data record (denoted Input Slice below) and a rotation angle (determined by the output of a Warp Function) to which each slice in the slice data record is to be rotated. Stated more succinctly, the generalized warping operation may be described as:

Warped Slice(*i*)=*VectorRotate*(Input Slice(*i*),WF(θ,*i*, other arguments))

Where i runs from 1 to the number of slices in the slice record. The rotation angle is derived from a warp function, angle(*i*)=WF(θ,*i*, other arguments)

In various embodiments, the selection of the warp function WF and the angle θ in the equation determines the properties of the resulting warped slice record.

WARP FUNCTION EXAMPLES—This section describes a number of warp functions, from a simple case to a more complex case from which several useful definitions may be derived.

Beginning with a relatively simple example, the warp function may be defined as WF( )=1·θ. Applying this warp function to the slice record results in the entire slice record being shifted by a constant phase angle θ. In the polar coordinate diagram of FIG. 5, this warp function corresponds to rotating all slice vectors by the same amount, θ. In the time domain, the constant phase shift advances or delays the incoming signal with respect to the receiver's reference templates, without otherwise altering the properties of the signal.

WARPING TO TUNE SLICES TO A NEW CENTER FREQUENCY—In one embodiment, the warp function may be defined as WF( )=−*i*·Φ where the canonical index i is the slice index number (not the complex root "i") and Φ is the angle between successive slices. Then Warped Slice(*i*)=*VectorRotate*(Input Slice(*i*),−*i*·Φ)

The warp operation may be carried out on the original slice terms (cos term, sin term) to generate the warped slice record comprising warped slice terms (warped cos term, warped sin term):

warped cos term(*i*)=cos term(*i*)·cos(−*i*·Φ)−sin term(*i*)·sin(−*i*·Φ)

warped sin term(*i*)=cos term(*i*)·sin(−*i*·Φ)+sin term(*i*)·cos(−*i*·Φ)

Figure 8:
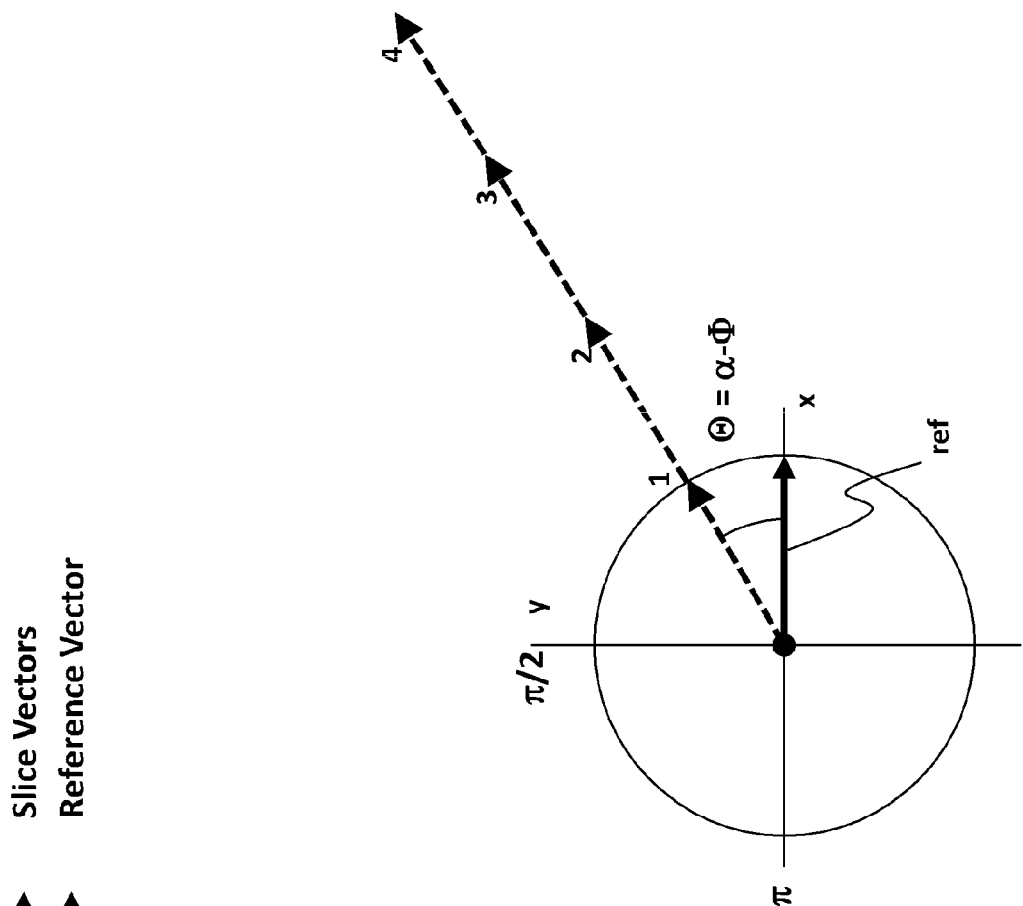
FIG. 8 shows slices warped, aligned and ready for combination, according to one embodiment.

The warp operation immediately above effectively re-tunes the receiver 104, using the stored slices, to a new frequency (freqRef+freqDelta). According to embodiments, this re-tuning is achieved from the stored slice data and not from a re-acquisition of slice data at some other frequency (such as the new frequency) or a re-processing of the original ADC samples—which were may have been discarded or never even stored upon acquisition thereof. Moreover, such an operation is not a straightforward vector rotation, but rather a warping operation on slices, which has the resulting effect of tuning a slice record from one frequency (freqRef) to another (freqRef+freqDelta). As shown in FIG. 8, slices 1, 2, 3 and 4, . . . N become aligned with each other. Performing a slice combining operation, as described earlier, on a set of warped slices produces a peak response at the warped frequency, freqRef+freqDelta. This corresponds to a filter tuned with this center frequency. FIG. 8 illustrates how slice combination (a vector addition), according to one embodiment, combines the aligned slice vectors resulting from the warp operation. If the incoming signal is a frequency equal to freqRef+freqDelta, slices in the warped slice record will be aligned with each other or substantially aligned with each other, and will combine to give the maximum possible filter response.

Figure 9:
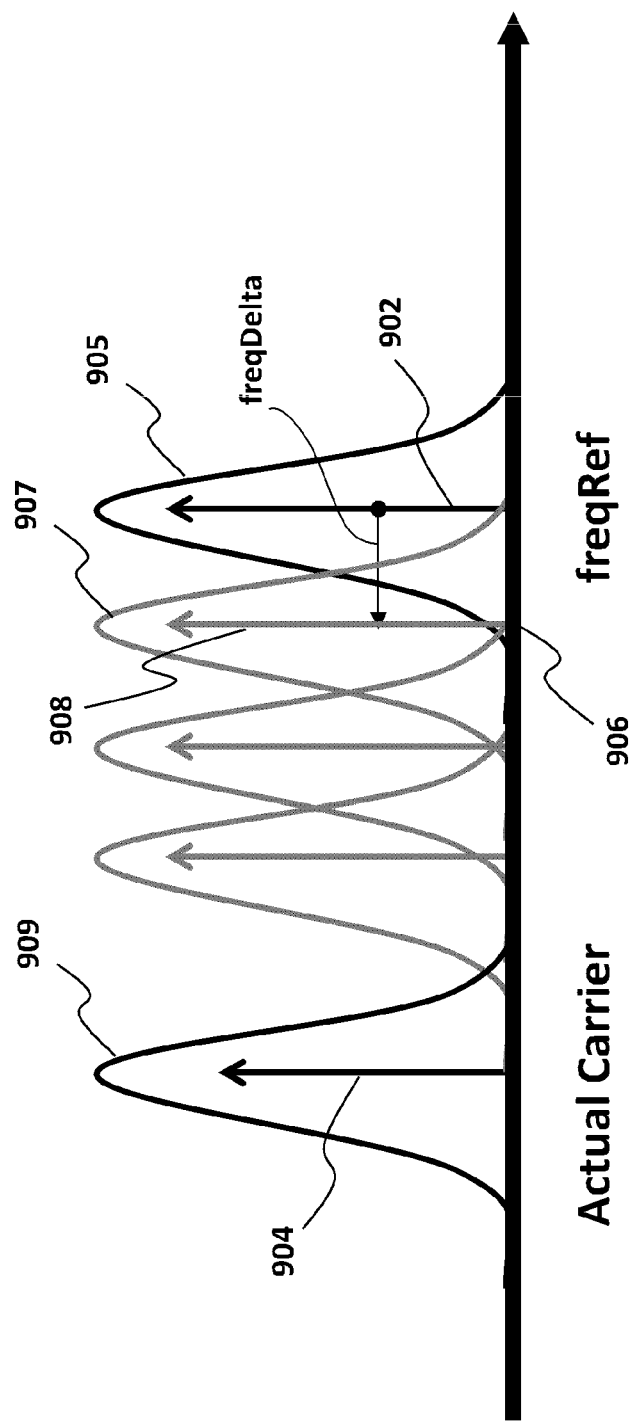
FIG. 9 shows aspects of a method for searching for a carrier frequency using warping of slices, according to one embodiment.

FINDING CARRIER BY WARPING AND SLICE COMBINATION—According to one embodiment, the warping and slice combining functions shown and described herein may be used to identify the incoming carrier during the initial phase of the detection process by searching for the transmitted carrier over a range of frequencies. As shown in FIG. 9, freqRef is a reference frequency such as, for example, the frequency at which the transmitter was nominally designed to transmit. The actual carrier 904 may be unknown a priori to the receiver 104, which may then search for the actual carrier, armed only with the knowledge of the reference frequency and perhaps some knowledge of the transmitter (for example, that the actual frequency at the receiver is unlikely to deviate from the reference frequency by more than some number of Hertz). According to one embodiment, to find the actual carrier 904 of the incoming signal, the incoming signal may be sampled and converted to digital form (optionally after some analog pre-processing) and converted to slice data (complex cosine, sine pairs). The received incoming data is, therefore, converted to slice data, indexed and stored (the sequential storing of the slice data starting from a known memory location may inherently operate to index the slice data) as the ADC 110 generates samples from the incoming pre-processed (e.g. filtered, amplified and/or normalized among other possible operations) analog data. The sampled incoming data (e.g. samples generated by the ADC 110) need not be stored and if stored, may be discarded after the generation and storage of the slice data. The stored slices may then be combined over a selectable number of slices to achieve a filter 905 having a correspondingly selectable bandwidth. The bandwidth of the filter may be selected by combining fewer (resulting in a broader filter) or a greater number of slices (resulting in a narrower filter). A peak in the filtered slice data may be indicative of the actual carrier. If no peak is detected indicative of the presence of the actual carrier 904 within the pass-band of the filter, the warping function shown and described above may be used to warp the original slices (in exemplary FIG. 9) to a next candidate frequency 906, a shift of freqDelta Hz in FIG. 9. The warped slices may again be combined to form a selectably narrow or broad filter at a new center frequency 907 and the presence of a peak 908 that is indicative of the actual carrier may be checked. This process may be repeated rapidly until the frequency of the actual carrier 904 is encompassed within the pass-band of the filter 909. Increasingly good estimates of the frequency of the actual carrier 904 may then be made by constructing one or more filters having a narrower band-width (by combining a greater number of slices) and checking for the presence of the actual carrier 904. Such narrower filters may aid the detection process, as a great deal of the noise may be attenuated, such that much of the energy within the pass-band of the filter originates from the carrier 904. The carrier hunt strategy described above is one simple strategy for locating the actual carrier. Other strategies may be envisioned that use warping and slice combination functions to achieve the same end.

USING A SINGLE SLICE RECORD TO DETECT FSK—According to one embodiment, the warping function shown and described herein may be used for efficient detection of Frequency Shift Keying (FSK) modulation. It is to be noted that FSK detection may also be carried out by performing two parallel slice computations, one at freq0 and one at freq1. Referring now to FIG. 10, the incoming data may be converted to slice data at one reference frequency (freqRef) 1001 that may be selected, according to one embodiment to be, for example, about mid-way between the known or nominal upper (freq1) 1002 and nominal lower (freq0) 1003 FSK frequencies. If not already, the slice data may then be indexed and stored as the ADC 110 generates digital samples from the incoming pre-processed analog data. The incoming data (e.g. samples from the ADC 110) need not be stored and if stored, may be discarded after the acquisition and storage of the slice data. The stored slices may then be selectably warped over a selectable number of frequencies and combined to achieve a first relatively wide-band filter having a center frequency that is centered on one of the two nominal FSK frequencies, say freq0 1004. Effectively, this re-tunes the receiver 104 from a first frequency (freqRef in this example) to a second frequency freq0 away from the first frequency by an amount (in Hz) equal to the difference between freqRef and freq0. Similarly, the original stored slices may then be selectably warped over a selectable number of frequencies and combined to achieve a second relatively wide-band filter having a center frequency that is centered on the second of the nominal FSK frequencies, freq1 1005 in this example. As was the case with the re-tuning of the receiver 104 to freq0, this effectively retunes the receiver 104 from the first frequency (freqRef in this example) to a second frequency freq1 away from the first frequency by an amount equal to the difference between freq1 and freqRef. When re-tuning the receiver 104 to freq0 and freq1, the pass-band of the first 1004 and second 1005 filters may be configured to be relatively wide (by combining relatively few slices) so as to increase the likelihood that, in each instance, the actual FSK frequencies (presumably in the vicinities of freq0 and freq1) will be located within the pass-band of the respective first and second filters. The warping function may be applied as needed to hunt or fine-tune for the actual FSK frequencies. The detection may be refined by constructing relatively narrower filters (by combining a relatively greater number of slices), which would increase the S/N of the output by attenuating a greater amount of noise.

Indeed, according to one embodiment and with reference to FIG. 11, supposing that an indication of the actual first and second FSK frequencies (actualfreq0 at reference numeral 1104 and actualfreq1 at reference numeral 1110) is detected within the pass-band of the wide-bandwidth filters generated from the slice data, the warping function may be used again for a precise identification of the two actual FSK frequencies actualfreq0 1104 and actualfreq1 1110. As shown, freq0 1102 and actualfreq0 1104 differ by freqDelta0 Hz, as shown at reference numeral 1106. Similarly, freq1 1108 and actualfreq1 1110 differ by freqDelta1 Hz, as shown at reference numeral 1112. The two deltas, namely freqDelta0 1106 and freqDelta1 1112, represent the amount of deviation of the two FSK frequencies away from the nominal FSK frequencies freq0 1102 and freq1 1108 at which the transmitter was designed to transmit. Such deviation may be caused by, for example, a calibration error caused by imperfect tuning of the transmitter at the factory, temperature effects, or other environmental effects such as local conductivity around the transmitter that influence the transmitted frequency. As such, freq0 1102 and freq1 1108 may be thought of as a first order approximation of the location of actualfreq0 1104 and actualfreq1 1110, respectively. To fine tune the receiver 104 to the two actual FSK frequencies actualfreq0 1104 and actualfreq1 1110 and to reject unwanted signal(s) (if any), the warping function may be again applied to the already-warped slice data to iteratively (if required) create suitably narrow bandwidth filters at different center frequencies until strong peaks indicative of the presence of the actual frequencies at 1104 and 1110 appear in the pass-bands of the filters. This process may be iteratively carried out until the actual frequencies at 1104 and 1110 are sufficiently isolated and the frequencies (noise, generally) on either side of the thus-created narrow-band filters are rejected to enable reliable detection and decoding.

Referring again to FIG. 11, after having detected the actual FSK signals around nominal frequencies freq0 1102 and freq1 1108, the warping function may be applied to re-tune the receiver 104 (if not already re-tuned as a result of searching for the two actual FSK frequencies) from freq0 1102 to actualfreq0 1104, by warping the filter by a few Hz, shown in FIG. 11 at freqDelta0 1106. Similarly, the warping function also may be applied to re-tune the receiver 104 from freq1 1108 to actualfreq1 1110, by again warping the filter by a few Hz, shown in FIG. 11 at freqDelta1 1112. The result of this fine tuning, therefore, is a receiver 104 that utilizes slice data acquired at freqRef and that has been re-tuned to the first and second actual FSK frequencies; namely, freqwarp0 1114 (equal to freq0−freqRef+freqDelta0) and freqwarp1 1116 (equal to freq1−freqRef+freqDelta1). As the relationship between the two FSK frequencies is known a priori to the receiver (such as a known ratio relationship), such relationship may be exploited by the receiver as it tunes the two separate FSK frequencies.

According to one embodiment, therefore, an FSK receiver 104 may be configured to be tuned at a frequency freqRef that is neither the first FSK frequency freq0 nor the second FSK frequency freq1. The receiver 104 may then be re-tuned, using warp and slice combining functions, to each of the first and second FSK frequencies freq0 and freq1 and, thereafter, to the actual FSK frequencies through fine-tuning without, however, re-acquiring data at either of these frequencies; that is, without re-acquiring new raw ADC data at the re-tuned frequency or without reading previously stored sampled raw data from memory 114. Moreover, such re-tuning according to embodiments may be carried out by processing vastly less data (by, e.g. orders of magnitude or more) than would otherwise be required had new ADC data been acquired or had the original data been maintained in memory 114 and re-processed to detect the freq0 and freq1 FSK frequencies. That is, according to one embodiment, the re-tuning of the receiver 104 may be effected solely by carrying out what are, for the most part, addition operations with some multiplication operations on a limited store of previously-acquired slice data.

WARPING TO REDUCE NOISE, ALIGN SLICES TO AN AXIS—Referring to FIG. 8, the aligned slice vectors have a non-zero cosine component along the x-axis and a non-zero sine component along the y-axis. Each of these components may include some signal component and some noise. According to one embodiment, if the aligned slice vectors of FIG. 8 were forced to align with, for example, the x-axis (thereby driving the sine component thereof to zero), the sine components thereof would include zero signal and only noise. This noise may be safely ignored, as all of the energy of the slice (and thus of the signal) is now aligned with the x-axis. Accordingly, one embodiment changes the warping function WF in the detection to put all the slice energy into one of the two dimensions. For instance, if all slices were to be pointed along the real axis (cosine, x-axis), then no signal would be left in the imaginary (sine, y-axis) axis, leaving only noise therein. According to one embodiment, therefore, aligning the warped slices to either the x, or y axis may be carried out by adding a constant angle ($\Theta$) to the warped slices:

$$WF(\Phi) = (i \cdot \Phi) + \Theta;$$

Accordingly, this implementation of the warping function adds a constant angle after scaling $\Phi$ by i, the slice index number. The addition of the constant angle, $\Theta$ (which may be positive or negative in sign) causes the output slices to be aligned in a selected (and preferred) direction, for example, aligned with the real axis (cosine component or x-axis) or the imaginary axis (sine component or y-axis). The warped slices, however, may be aligned by warping to any angle though judicious selection of the constant angle.

WARPING TO CORRECT FREQUENCY DEFECT—According to further embodiments, warping functions may be devised based on more sophisticated patterns or sequences of the slice index number. For example, the scaling factor need not be an integer. For example, if a transmitter transmits packets whose frequency falls (or rises) towards the end of a packet, the warping function may be adapted to track that falling frequency toward the end of the packet. For example, assuming the receiver has identified the starting slice index of a packet, the following warp function could be applied to the slice record for the purpose of aligning all slices in a packet.

$$WF(\ ) = (\text{Scaling Factor} \cdot i \cdot \Phi))$$

where, for example, Scaling Factor=[1 1 1 1 1 1 1 1 0.9 0.9 0.8 0.8 0.7 0.6 0.5 0.3 etc.] The scaling factor may be an algebraic expression or may be read from a table stored in memory 114 with suitable values stored therein. The warping function, in this manner, may be configured to track any quantifiable change in the frequency profile of the received packets, thereby allowing for, for example, non-constant and/or non-integer sequential adjustments of warping angle $\Phi$ from slice to slice.

WARPING TO DETECT CHIRP—Warping, according to one embodiment, also may be applied to any incoming signal having a non-constant frequency, such an intentional chirp-type signal, or a transmitter with poor frequency control where the frequency of the transmitted signal increases or decreases as the transmitter battery depletes.

For example, if the incoming signal is a rising chirp, the slice data may be warped by an angle that increases faster than the integer pattern shown and described relative to FIGS. 7 and 8. For example, the first slice may be warped by $1 \cdot \Phi$, the second slice may be warped by $2.2 \cdot \Phi$, the third slice may be warped by $3.3 \cap \Phi$, and so on. According to embodiments, therefore, the computation of the warping angle may comprise any function that reflects the frequency structure of the expected incoming signal. The use of slices, according to embodiments, enables efficient use of resources, in that a high degree of data compression may be achieved by converting the raw sample stream from the ADC 110 to slice data and discarding (or failing to store) the raw sample data. This is significant not only in terms of the size of the memory 114 required, but also in terms of the amount of calculations to be carried out later in the detection and decoding processes. The use of slices, warping functions, and slice combining functions, according to embodiments, also affords the receiver 104 a high degree of flexibility at multiple places in the detection algorithm. Because the original slices can be designed to have a relatively wide bandwidth, they can be re-tuned/warped over great number of Hz in either direction. For example, a slice with a 5000 Hz bandwidth, according to embodiments, may be warped 1000-2000 Hertz or more, up or down, without significant loss of signal strength. SLICE CORRELATION: FINDING A KNOWN PATTERN—According to one embodiment, a detection procedure may be carried out, to determine the presence of one or more data packets in the slice record. According to one embodiment, it is not the original raw ADC sampled data stream that is analyzed (which may have been previously discarded anyway), but the indexed and stored slice data. According to one embodiment, a function (for example, a real or complex correlation function) may be applied to the slice data, to compare the slice data with one or more pre-stored slice patterns corresponding to a known slice pattern in the signal. According to one embodiment, the data packets sought to be detected (and framed, to determine the boundaries thereof) may comprise a preamble of known length and configuration, followed by a payload of known length from which useful information may be extracted by a decoding process. For example, each data packet sought to be detected may comprise a preamble comprising 11 bits. For example, the preamble may comprise a known sequence such as, for example, a sequence of 7 zeros, followed by 1010 (00000001010). To determine the presence of a packet, therefore, a real or complex correlation function may be applied, according to one embodiment, to cross-correlate slice data to a slice pattern corresponding to the known preamble. To the extent that the slice data encodes data corresponding to one or more preambles of one or more data packets, the correlation function will return higher results when the preamble(s) of the input slice data and that of the template are aligned with one another, correspondingly lower results as the preambles in the input slice data and the template are only partially aligned with one another and lowest results when the preambles in the input slice data and the template are not aligned with one another or the input slices do not comprise any packets. This cross-correlation operation represents a very narrow-band filter, with bandwidth proportional to the reciprocal of the number of slices in the known preamble.

In one embodiment, slice correlation and warping may be used together to provide a fair estimate of the actual carrier frequency of the received signal, as the receiver 104 is iteratively re-tuned through warping and the resultant warped slices correlated with, for example, the expected slice pattern used to determine the presence and boundaries of the preamble. In this manner, a high correlation value may be associated with the actual carrier frequency of the received signal.

SLICE CORRELATION: FINDING EVIDENCE OF A PACKET—According to one embodiment, a detection procedure may be carried out to determine the presence of one or more data packets in the slice record prior to determining the frequency(ies) of the carrier(s). As in the discussion of cross-correlation with a pre-stored template above, only the indexed and stored slice data need be analyzed. According to one embodiment, a function (for example, a real or complex correlation function) may be applied to the slice data, to compare the slice data with itself (auto-correlation). Often, it is useful to perform correlation calculations at just a few different lags. For example, is the energy for an entire slice record, A, can be estimated by slice correlation with lag=0:

$$\text{Corr}(0) = \sum_{n=1}^{N} A_n \times A_n$$

AutoCorr(0) represents the baseline energy level for the slice record, against which other autocorrelations can be compared.

For a slice record containing no packets, slice auto-correlation with lag=1:

$$\text{Corr}(1) = \sum_{n=1}^{N-1} A_n \times A_{n+1}$$

According to one embodiment, prior to determining the frequency(ies) of the carrier(s), an autocorrelation may be performed on the slice record A to determine if a packet is present therein. For a case where the slice record contains one or more packets, Corr(1) will have a higher value relative to Corr(0). This is an indication that a packet exists somewhere in the slice record. For a slice record containing no packets, slice auto-correlation with lag=1 will have a very low value relative to AutoCorr(0) if the slice record contains only uncorrelated noise. According to one embodiment, a packet may be considered to have been detected when the autocorrelation term Corr(1)/Corr(0) is determined to be above a predetermined threshold.

Confirmatory evidence for the presence of a packet can be developed if multiple packets exist in the slice record at a known packet separation m (measured in slices). Correlating the slice record with a lag=m (lag equal to the packet spacing) produces a high correlation result if packets are present at the anticipated spacing:

$$\text{Corr}(m) = \sum_{n=1}^{N-m} A_n \times A_{n+m}$$

According to one embodiment, a packet may be considered to have been detected when the correlation terms computed multiple times over a range of anticipated packet separations, Corr(m±range), are determined to be above a predetermined threshold relative to Corr(0). The expected range of packet separations arises due to variations in the as-yet to be determined packet frequency. In this manner, using slice data, packet detection may be carried out by correlating a delayed version of the slice record A with the slice record A and monitoring the magnitude of the resulting correlation terms.

OVERLAPPING PACKETS—According to one embodiment, the greater the number of packets in a slice data record, the better the auto-correlation results may be. Slices representing multiple suspected packets may be added to one another, to increase the likelihood of correct packet detection. Moreover, the packet boundaries may be determined by adding two or more suspected packets with one another. The result of the addition will be highest when the respective packets are perfectly aligned. The suspected packets may be shifted by one or more slices (according to one embodiment, by the number of slices between packets) and the addition operation may be applied to the shifted packets in this manner to determine the boundaries of the packets. It is to be understood, however, that there is more than one method of packet detection and framing. All such methods are understood to be encompassed by the present embodiments. It is also to be understood that, having identified the boundaries of packets, the signal to noise ratio is increased when only the packet is observed, as the only noise present is that within the packet and as all noise outside of the packet boundaries may be excluded or greatly attenuated.

MODULATION SCHEME: BPSK—The packet need not be encoded and decoded using FSK modulation. According to one embodiment, another forms of digital modulation may be used such as, for example, binary phase shift keying (BPSK). In such an encoding scheme, the symbol 0 may be encoded using a sine waveform of a certain number of cycles and the symbol 1 may be encoded using a—sine waveform out of phase by π radians of the same number of cycles. For example, a packet encoded using BPSK may comprise a preamble and a payload. The preamble may comprise, for example, seven 0s, followed by 1, 0, 1 and 0, in the form (000000001010). Real or complex correlation methods may be utilized, as described above, to determine the presence of one or more packets by comparing the slice record to a predetermined slice pattern representing the preamble. This operation serves to identify the presence of a packet and to synchronize the receiver 104 with the starting bit of the preamble. As noted above, the correlation function may additionally provide an estimate of the actual carrier frequency of the signal.

ITERATIVE DECODING—According to one embodiment, the bits of the packet payload may be decoded in the receiver one at a time in succession. To determine whether a bit is a logic zero or a logic one, successive correlations against a "zero template" and a "one template" may be used, with the larger of the two correlation results indicating the value of the bit. Such a method may, according to one embodiment, be used to decode the payload of a packet that appears after the preamble thereof, as the bit sequence in the payload is most often unknown a-priori by the receiver.

ARCTANGENT—According to one embodiment, in cases in which the signal to noise ratio is reasonable (e.g. around 0 dB or above), taking the arctangent of slices containing suspected packets may be revealing, and may identify the presence or absence of a packet.

CARRIER HUNT STRATEGY—According to one embodiment, once the presence of one or more packets in the slice data is determined, to determine the frequency(ies) with which the packets were modulated, whether encoded using FSK or PSK (for example) or however encoded, if a rough estimate of the actual frequency of the signal is known (say within 20 Hz, for example for an exemplary 20 kHz signal), the magnitudes of the correlations of the preamble, for example, may be determined at each of 20 different frequencies, at 1 Hz (or less) increments. According to one embodiment, the rough estimate of the carrier frequency(ies) may be the nominal frequency(ies) with which the transmitter is designed to transmit. Some knowledge of the communication channel may enable such an educated guess as to the frequency range within which the actual signal is likely to be found. In such a case, after having computed the correlation for each frequency within the frequency range, the frequency associated with the largest correlation magnitude may be safely assumed to be the (or one of the) carrier frequencies.

FIX DETECTION BY FLATTENING PHASE—It is to be understood that other methods of determining the frequency of a detected packet may be employed, without departing from the scope of the embodiments described in the present disclosure. For example, for each bit of a packet, the phase angles of the bit's constituent slices may be determined. The phase angles may, according to one embodiment, be determined by taking the arctangent (the ratio of the sine component of the slice to the cosine component) of each slice. Such a method may be best implemented when the signal to noise ratio is above a predetermined threshold such as, for example, about 0 dB. For BPSK modulation, such a phase angle, may swing between 0 and 2π, in a saw-tooth like fashion. The presence of such a saw-tooth pattern is suggestive that the constituent slices making up the bits being examined are, using the polar representation of FIG. 7, misaligned, as are slices 1, 2, 3 and 4 in that figure. With reference to FIG. 8, when the frequency being tested results in warping angles that form more or less a straight line (as opposed to a saw-tooth pattern), that frequency may be the or close to the actual frequency of the signal of interest. For PSK, for example, the warping angles will shift from one warping angle to another warping angle that is indicative of the PSK frequency at which the data was encoded. The resultant pattern may then resemble a square wave, from which the data may be readily apparent.

MODULATION SCHEME: MSK—Using methods similar to those previously described, data encoded using other modulation formats may be detected and decoded using only the stored slices and the warping function described herein. For example, the data in the slices may have been encoded using, for example, Multiple Shift Keying (MSK) using, for example, 4 frequencies or, for example, 16 frequencies to represent different symbols. In this case, each symbol may comprise information bits encoded with one or more frequencies (e.g. one or two) out of a plurality (e.g. 16) of frequencies, with each symbol potentially representing more than one bit. Other modulation formats that encode data may be decoded using only the slice information (and not the original data from the ADC 110, which has since been discarded) and the warping and slice combining functions described herein. Moreover, data encoded using combinations of modulation formats also may be detected and decoded, again using only slice information, warping, and slice combination. For example, data encoded with a combination of MSK and PSK may be decoded from the retained slice data.

In each case, the computational load on the controller 112 portion of the receiver 104 is lighter than it otherwise would be if the controller 112 were obliged to re-process the original raw data stream. For similar reasons, the memory requirements of the receiver's controller 112 are orders of magnitude less than would be the case had it been necessary to store the original raw incoming data in order to operate thereon later, during detection and decoding.

ONE-BIT ADC—For situations exhibiting an especially low signal to noise ratio, it may be advantageous for the receiver 104 to use an analog comparator or a 1-bit ADC to quantize the signal as being above or below a predetermined threshold (encoded as two values: +1 and −1). In this manner, the amount of data that is stored in the slice construct, according to embodiments, greatly decreases compared to storing multi-bit representations of the signal. A comparator or a 1-bit ADC may be used to good advantage in situations exhibiting low signal to noise ratio, as it enables samples to be gathered at a very high sample rate while still computing slices in a fast real-time loop on an ordinary processor. Inside the real-time loop, multiply operations are greatly simplified because one of the operands is either +1 or −1.

Figure 12:
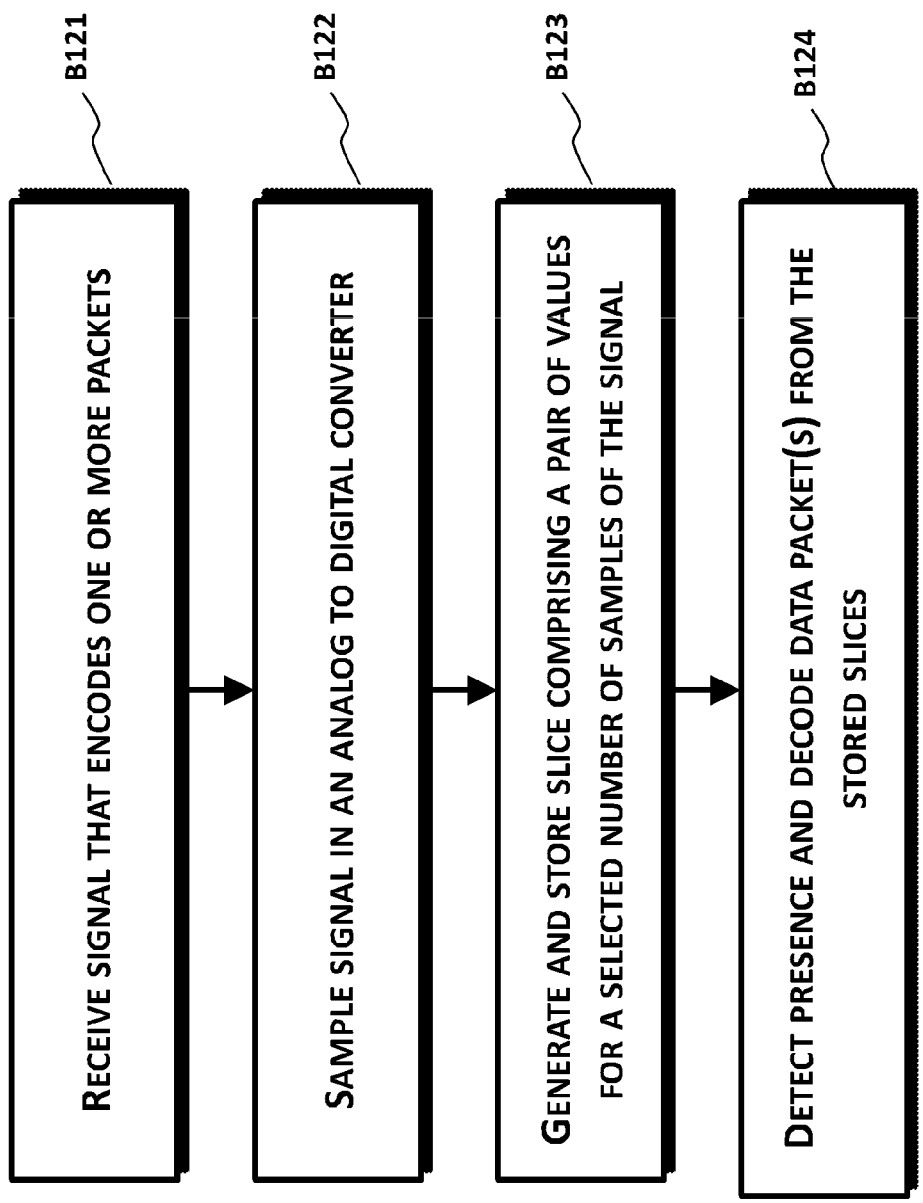
FIG. 12 is a logic flow of a method of detecting a signal, according to one embodiment.

FIG. 12 is a logic flow of a method according to one embodiment. As shown therein, at B121 a signal that encodes one or more data packets is received. At B122, the received signal then may be sampled in an ADC to generate sampled values. At B123, a slice then may be generated and stored in memory, where each slice comprises a pair of values representing a selected slice interval of time. At B124, data packets are detected and decoded from the stored slices using various combinations of warp and slice combination operations.

Figure 13:
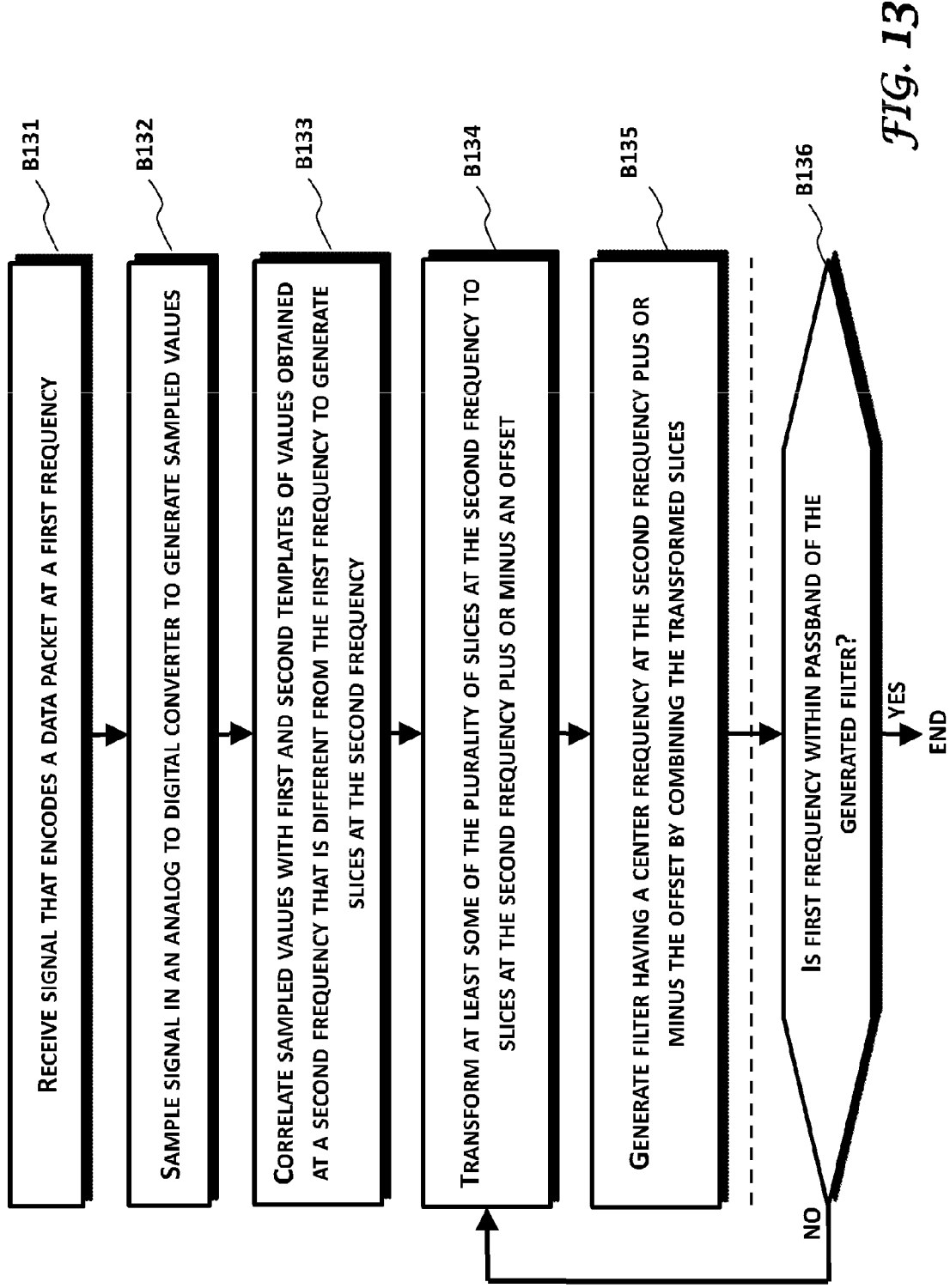
FIG. 13 is a logic flow of a method according to one embodiment.

FIG. 13 is a logic flow of a method according to one embodiment. As shown therein, at B131, a signal may be received that encodes a data packet at a first frequency. The received signal, as shown at B132, may then be sampled in an ADC to generate sampled values. The sampled values, as called for at B133, may then be correlated with first and second templates of values obtained at a second frequency that may be different from the first frequency to generate slices at the second frequency. According to one embodiment and as described and shown herein, the first template may be generated using a first reference function and the second template may be generated using a second reference function that is in quadrature with the first reference function. Some or all of the slices at the second frequency may be transformed (also denoted as "warped" herein) to slices at the second frequency (also denoted as "freqRef" herein), plus or minus an offset (denoted as "freqDelta" herein), as shown at B134. As shown at B135, a filter having a center frequency at the second frequency plus or minus the offset may be generated by combining the transformed (warped) slices.

According to one embodiment, a determination may then be made, as suggested at B136, whether the first frequency (the frequency of interest at which the data packet(s) is/are encoded) is within the pass-band of the generated filter. If the first frequency is indeed within the pass-band of the thus-generated filter, further steps may be carried out such as, for example, detection and decoding steps, as detailed herein. If the first frequency is not present within the pass-band of the generated filter, the slice transforming (warping) and filter generating (slice combining) steps may be iteratively repeated using respectively different offsets until the first frequency is indeed within the pass-band of the filter, as indicated by the NO branch of B136.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Embodiments of the present invention have been described above. Further embodiments of the present invention can also be realized by systems or apparatuses that read out and execute programs recorded on a memory device to perform the functions of the above-described embodiment(s), and by a method, the steps of which are performed by, for example, reading out and executing a program recorded on a memory device to perform the functions of the above-described embodiment(s). For this purpose, the program may be provided to the system or apparatus (e.g. receiver), for example via a network or from a recording medium of various types serving as the memory device (e.g. computer-readable medium).

The present invention may be defined by way of the following clauses. It will be understood that the features recited are interchangeable defined by the following clauses and their dependencies. That is, the features of the clauses may be combined to define the present invention.

CLAUSES

1. A method, comprising:
   receiving a signal, the signal encoding a data packet;
   sampling the received signal;
   generating and storing a plurality of slices comprising pairs of values for each of a selected number of samples of the signal; and
   detecting a presence of and decoding the data packet from the stored slices.
2. The method of clause 1, wherein generating each of the plurality of slices comprises:
   correlating samples of the signal with a first reference template;
   generating a first value of the pair of values;
   correlating the selected number of samples of the signal with a second reference template; and
   generating a second value of the pair of values.
3. The method of clause 2, wherein the first reference template comprises a cosine function at a reference frequency and the second reference template comprises a sine function at the reference frequency.
4. The method of any of clauses 1 to 3, further comprising forming a filter by combining a number of the plurality of slices.
5. The method of any of clauses 1 to 4, wherein detecting the presence of the packet comprises detecting a carrier frequency within a pass-band of a filter formed by the plurality of slices.
6. The method of any of clauses 1 to 4, wherein detecting the presence of the packet comprises detecting a carrier frequency within a pass-band of a filter formed by combining slices.
7. The method of any of clauses 4 to 6, wherein detecting further comprises re-tuning a center frequency of the filter from a first center frequency to a second center frequency that is different from the first center frequency using the stored slices.
8. The method of clause 7, wherein re-tuning the center frequency of the filter comprises warping the slices from which the filter was formed by rotating the respective pairs of values thereof by a quantity.
9. The method of clause 8, wherein the quantity comprises a rotation angle, a scaling factor and indices associated with the slices from which the filter was formed.
10. The method of clause 8, wherein the quantity comprises a sum of a phase angle from a reference frequency and a product of a rotation angle and a slice index.
11. A signal receiver, comprising:
    analog-to-digital converter means (ADC) configured to sample a received signal; memory means;
    controller means coupled to the memory means and configured to:
       generate and store, in the memory means, a slice comprising a pair of values for each of a selected number of samples of the signal; and
       detect a presence of and decode the data packet from the stored slices.
12. The signal receiver of clause 11, wherein the memory means is configured to store at least a first reference template and a second reference template and wherein the controller means is further configured to correlate the selected number of cycles of the sampled signal with the first reference template to generate a first value of the pair of values and to correlate the selected number of samples of the signal with the second reference template to generate a second value of the pair of values.
13. The signal receiver of clause 11 or clause 12, wherein the controller means is further configured to combine a number of slices to form a filter.
14. The signal receiver of clause 13, wherein a bandwidth of the filter is related to the number of combined slices.
15. The signal receiver of any of clauses 11 to 14, wherein the controller means is further configured to detect the presence of the packet by detecting a carrier frequency within a pass-band of a filter formed by combining the slices.
16. The signal receiver of any of clauses 13 to 15, wherein the controller means is further configured to re-tune, using the stored slices, a center frequency of the filter from a first center frequency to a second center frequency that is different from the first center frequency.
17. The signal receiver of any of clauses 11 to 16, wherein the signal encodes data packets at a first frequency and wherein controller means is further configured to:

correlate the samples with first and second templates of values obtained at a second frequency that is different from the first frequency to generate a plurality of slices that each comprise a pair of values;
transform at least some of the plurality of slices at the second frequency to slices at the second frequency plus or minus an offset, and
generate a filter having a center frequency at the second frequency plus or minus the offset by combining the transformed slices.

18. A method, comprising:
receiving a signal, the signal encoding a data packet at a first frequency;
sampling the signal to generate sampled values;
correlating the sampled values with first and second templates of values obtained at a second frequency that is different from the first frequency to generate a plurality of slices at the second frequency, each of the slices comprising a pair of values;
transforming at least some of the plurality of slices at the second frequency to slices at the second frequency plus or minus an offset, and
generating a filter having a center frequency at the second frequency plus or minus the offset by combining the transformed slices.

19. The method of clause 18, further comprising determining whether the first frequency is within a pass-band of the generated filter 20. The method of clause 19, further comprising iteratively transforming, generating and determining using respectively different offsets until the first frequency is within the pass-band of the filter.

21. A method, comprising:
receiving a signal, the signal encoding a data packet;
sampling the signal to generate sampled values;
generating a slice record comprising a plurality of slices by correlating the sampled values with first and second reference templates, the first reference template comprising a first
reference function and the second reference template comprising a second reference function in quadrature with the first reference function;
auto-correlating a portion of the slice record with a delayed version of the portion of the slice record to generate auto-correlation terms; and
determining when magnitudes of auto-correlation terms exceed a predetermined threshold for a predetermined number of auto-correlation terms.

22. The method of clause 21, further comprising determining a carrier frequency of the received signal.

23. The method of clause 22, wherein determining comprises:
warping at least some of the plurality of slices by a frequency offset, and
generating a filter from the warped slices and,
determining whether the carrier frequency is within a pass-band of the generated filter.

24. A method, comprising:
receiving a signal, the signal encoding a data packet;
sampling the signal to generate sampled values;
generating a slice record comprising a plurality of slices from the sampled values by correlating the sampled values with first and second reference templates, the first reference template comprising a first reference function and the second reference template comprising a second reference function in quadrature with the first reference function;
cross-correlating the slice record with a stored template to generate cross-correlation terms; and
determining when a magnitude of the cross-correlation terms exceeds a predetermined threshold for a width of the stored template.

25. The method of clause 24, wherein the first reference template comprises a cosine function and wherein the second template function comprises a sine function.

26. The method of clause 24, further comprising determining a carrier frequency of the received signal.

27. A method, comprising:
receiving a signal;
sampling the signal to generate sampled values;
correlating the sampled values with predetermined first and second templates of values obtained at a first frequency to generate a plurality of slices at the first frequency;
transforming at least some of the generated plurality of slices at the first frequency to slices at a second frequency that is different from the first frequency;
generating a first filter having from the slices at the second frequency;
transforming at least some of the generated plurality of slices at the first frequency to slices at a third frequency that is different from the first and second frequencies, and
generating a second filter from the slices at the third frequency.

28. The method of clause 27, further comprising discarding the generated sampled values of the received signal after generating the plurality of slices at the first frequency.

29. The method of clause 27 or clause 28, further comprising detecting a first carrier frequency within a pass-band of the first filter and detecting a second carrier frequency within a pass-band of the second filter.

30. A method, comprising:
receiving a signal, the signal encoding data packets;
sampling the signal to generate sampled values;
generating a slice record comprising a plurality of slices from the sampled values by correlating the sampled values with first and second reference templates, the first reference template comprising a first reference function and the second reference template comprising a second reference function in quadrature with the first reference function;
auto-correlating a portion of the slice record spanning at least two preambles of the encoded data packets with a delayed version thereof to generate auto-correlation terms; and
determining when magnitudes of auto-correlation terms exceed a predetermined threshold for a predetermined number of auto-correlation terms.

31. The method of clause 30, further comprising determining boundaries of the data packets from magnitudes of the auto-correlation terms.

32. The method of clause 30 or clause 31, wherein the carrier frequency of the signal is detected when successive phase angles, across bits of the data packet, least resemble a first predetermined pattern and most resemble a second predetermined pattern.

33. A program, which when executed by a computer, causes the computer to carry out the method of any of clauses 1 to 10 and 18 to 32.

34. A program which, when executed by a computer, causes the computer to function as the signal receiver of any of clauses 11 to 17.

35. A storage medium storing the program according to clause 33 or clause 34.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and aspects of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary aspects shown and described herein. Rather, the scope and spirit of present invention is embodied by the appended claims.

We claim:

1. A method implemented by a receiver, the method comprising:
    receiving a signal, by an analog front-end of the receiver, the signal encoding a data packet at a first frequency;
    sampling the signal, by an analog-to-digital converter (ADC) of the receiver to generate sampled values;
    correlating, by a controller of the receiver, the sampled values with first and second templates of values obtained at a second frequency that is different from the first frequency to generate a plurality of slices at the second frequency, each of the slices comprising a pair of values;
    transforming, by the controller, at least some of the plurality of slices at the second frequency to slices at the second frequency plus or minus an offset, and
    generating, by the controller, a filter having a center frequency at the second frequency plus or minus the offset by combining the transformed slices.

2. The method of claim 1, further comprising determining whether the first frequency is within a pass-band of the generated filter.

3. The method of claim 2, further comprising iteratively transforming, generating and determining using respectively different offsets until the first frequency is within the pass-band of the filter.

4. The method of claim 1, further comprising discarding the sampled values of the received signal.

5. The method of claim 1, further comprising storing and indexing the generated plurality of slices in a memory.

6. A receiver, comprising:
    an analog-to-digital converter (ADC) configured to generate sampled values from a received signal at a first frequency, wherein an analog front-end of the receiver receives the received signal;
    a memory;
    a controller coupled to the memory and configured to:
        correlate the sampled values over respective selected numbers of the sampled values of with first and second templates of values obtained at a second frequency that is different from the first frequency to generate a plurality of slices that each comprise a pair of values;
        transform at least some of the plurality of slices at the second frequency to slices at the second frequency plus or minus an offset, and generate a filter having a center frequency at the second frequency plus or minus the offset by combining the transformed slice.

7. The receiver of claim 6, wherein the controller is further configured to store and index the slices in the memory.

8. The receiver of claim 6, further comprising discarding the sampled values of the received signal.

9. The receiver of claim 6, wherein the controller is further configured to determine whether the first frequency is within a pass-band of the generated filter.

10. The receiver of claim 9, wherein the receiver is further configured to iteratively transform, generate and determine using respectively different offsets until the first frequency is within the pass-band of the filter.

11. A method implemented by a receiver, the method, comprising:
    receiving a signal, by an analog front-end of the receiver, the signal encoding a data packet;
    sampling the signal, by an analog-to-digital converter (ADC) of the receiver to generate sampled values;
    generating, by a controller of the receiver, a slice record comprising a plurality of slices by correlating the sampled values with first and second reference templates, the first reference template comprising a first reference function and the second reference template comprising a second reference function in quadrature with the first reference function;
    auto-correlating, by the controller, a portion of the slice record with a delayed version of the portion of the slice record to generate auto-correlation terms; and
    determining, by the controller, when magnitudes of auto-correlation terms exceed a predetermined threshold for a predetermined number of auto-correlation terms.

12. The method of claim 11, wherein the predetermined threshold is a predetermined noise threshold.

13. The method of claim 11, wherein the predetermined number of correlation terms is associated with an expected width of at least a preamble of the data packet.

14. The method of claim 11, wherein the first reference function comprises a cosine function and wherein the second reference function comprises a sine function.

15. The method of claim 11, further comprising determining a carrier frequency of the received signal.

16. The method of claim 15, wherein determining comprises:
    warping at least some of the plurality of slices by a frequency offset, and generating a filter from the warped slices, and determining whether the carrier frequency is within a passband of the generated filter.

17. The method of claim 16, wherein warping and generating comprise shifting a center frequency of the generated filter without re-acquiring or re-sampling the signal.

18. The method of claim 11, further comprising discarding the sampled values of the received signal after generating the slice record.

* * * * *